United States Patent
Schneck et al.

(10) Patent No.: US 6,314,409 B2
(45) Date of Patent: *Nov. 6, 2001

(54) SYSTEM FOR CONTROLLING ACCESS AND DISTRIBUTION OF DIGITAL PROPERTY

(75) Inventors: Paul B. Schneck, Potomac; Marshall D. Abrams, Silver Spring, both of MD (US)

(73) Assignee: Veridian Information Solutions

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 10 days.

This patent is subject to a terminal disclaimer.

(21) Appl. No.: 09/178,606

(22) Filed: Oct. 26, 1998

Related U.S. Application Data

(62) Division of application No. 08/968,887, filed on Nov. 5, 1997, which is a continuation of application No. 08/584,493, filed on Jan. 11, 1996, now abandoned.

(51) Int. Cl.$^7$ ........................................................ H04L 9/00
(52) U.S. Cl. ............................ 705/54; 705/57; 380/259; 380/287; 380/59; 713/182; 713/189; 713/193; 713/194; 713/200
(58) Field of Search .............................. 395/186, 187.01, 395/188.01; 380/4, 23, 25, 49, 50, 59, 200–204, 210, 255, 259, 277, 278, 279, 29, 30, 287; 705/43, 51, 52, 54, 57, 58; 713/150–152, 182, 189, 193, 194, 200, 201, 202

(56) References Cited

U.S. PATENT DOCUMENTS 3,504,132   3/1970   Wallace, Jr. .
3,648,020 * 3/1972   Tateisi et al. ....................... 705/43

(List continued on next page.)

FOREIGN PATENT DOCUMENTS 0332707   9/1989   (EP) .

(List continued on next page.)

OTHER PUBLICATIONS

Weber, R., "Metering Technologies For Digital Intellectual Property," A Report to the Internatinal Federation of Reproduction Rights Organization, Oct. 1994, pp. 1–29.

(List continued on next page.)

*Primary Examiner*—Bernarr E. Gregory
(74) *Attorney, Agent, or Firm*—Pillsbury Winthrop

(57) ABSTRACT

A method and device are provided for controlling access to data. Portions of the data are protected and rules concerning access rights to the data are determined. Access to the protected portions of the data is prevented, other than in a non-useable form; and users are provided access to the data only in accordance with the rules as enforced by a mechanism protected by tamper detection. A method is also provided for distributing data for subsequent controlled use of those data. The method includes protecting portions of the data; preventing access to the protected portions of the data other than in a non-useable form; determining rules concerning access rights to the data; protecting the rules; and providing a package including: the protected portions of the data and the protected rules. A user is provided controlled access to the distributed data only in accordance with the rules as enforced by a mechanism protected by tamper protection. A device is provided for controlling access to data having protected data portions and rules concerning access rights to the data. The device includes means for storing the rules; and means for accessing the protected data portions only in accordance with the rules, whereby user access to the protected data portions is permitted only if the rules indicate that the user is allowed to access the portions of the data.

43 Claims, 26 Drawing Sheets

U.S. PATENT DOCUMENTS

| | | |
|---|---|---|
| 3,764,742 | 10/1973 | Abbott et al. . |
| 3,798,359 | 3/1974 | Feistel . |
| 3,878,331 | 4/1975 | Morgan et al. . |
| 3,906,460 | 9/1975 | Halpern . |
| 3,911,216 | 10/1975 | Bartek et al. . |
| 3,944,976 | 3/1976 | France . |
| 3,958,081 | 5/1976 | Ehrsam et al. . |
| 3,996,449 | 12/1976 | Attanasio et al. . |
| 4,004,089 | 1/1977 | Richard et al. . |
| 4,028,678 | 6/1977 | Moran . |
| 4,037,215 | 7/1977 | Birney et al. . |
| 4,074,066 | 2/1978 | Ehrsam et al. . |
| 4,087,856 | 5/1978 | Attanasio . |
| 4,120,030 | 10/1978 | Johnstone . |
| 4,168,396 | 9/1979 | Best . |
| 4,183,085 | 1/1980 | Roberts et al. . |
| 4,193,131 | 3/1980 | Lennon et al. . |
| 4,206,315 | 6/1980 | Matyas et al. . |
| 4,238,854 | 12/1980 | Ehrsam et al. . |
| 4,246,638 | 1/1981 | Thomas . |
| 4,264,782 | 4/1981 | Konheim . |
| 4,278,837 | 7/1981 | Best . |
| 4,281,215 | 7/1981 | Atalla . |
| 4,306,289 | 12/1981 | Lumley . |
| 4,319,079 | 3/1982 | Best . |
| 4,323,921 | 4/1982 | Guillou . |
| 4,433,207 | 2/1984 | Best . |
| 4,446,519 | 5/1984 | Thomas . |
| 4,454,594 | 6/1984 | Heffron et al. . |
| 4,458,315 | 7/1984 | Uchenick . |
| 4,465,901 | 8/1984 | Best . |
| 4,471,163 | 9/1984 | Donald et al. . |
| 4,529,870 | 7/1985 | Chaum ................................. 235/380 |
| 4,558,176 | 12/1985 | Arnold et al. . |
| 4,646,234 | 2/1987 | Tolman et al. ........................... 380/4 |
| 4,658,093 | 4/1987 | Hellman ................................. 380/25 |
| 4,757,533 | 7/1988 | Allen et al. ............................. 380/25 |
| 4,796,181 | 1/1989 | Wiedemer ........................... 380/4 X |
| 4,827,508 | 5/1989 | Shear . |
| 4,924,378 | 5/1990 | Hershey et al. . |
| 4,932,054 | 6/1990 | Chou et al. ............................... 380/4 |
| 4,937,863 | 6/1990 | Robert et al. ............................. 380/4 |
| 4,953,209 | 8/1990 | Ryder, Sr. et al. ..................... 380/23 |
| 4,961,142 | 10/1990 | Elliott et al. . |
| 4,977,594 | 12/1990 | Shear ......................................... 380/4 |
| 5,010,571 | 4/1991 | Katznelson ............................... 380/4 |
| 5,014,234 | 5/1991 | Edwards, Jr. . |
| 5,023,907 | 6/1991 | Johnson et al. .......................... 380/4 |
| 5,027,396 | 6/1991 | Platteter et al. . |
| 5,047,928 | 9/1991 | Wiedemer . |
| 5,050,213 | 9/1991 | Shear . |
| 5,058,162 | 10/1991 | Santon et al. . |
| 5,058,164 | 10/1991 | Elmer et al. ........................... 380/50 |
| 5,103,476 | 4/1992 | Waite et al. ............................. 380/4 |
| 5,113,519 | 5/1992 | Johnson et al. . |
| 5,146,499 | 9/1992 | Geffrotin ............................... 380/23 |
| 5,159,182 | 10/1992 | Eisele ................................... 235/492 |
| 5,191,193 | 3/1993 | LeRoux ............................... 235/379 |
| 5,204,897 | 4/1993 | Wyman ................................... 380/4 |
| 5,222,134 | 6/1993 | Waite et al. ............................. 380/4 |
| 5,235,642 | 8/1993 | Wobber et al. . |
| 5,247,575 | 9/1993 | Sprague et al. . |
| 5,260,999 | 11/1993 | Wyman . |
| 5,263,157 | 11/1993 | Janis . |
| 5,263,158 | 11/1993 | Janis . |
| 5,291,596 | 3/1994 | Mita ..................................... 395/600 |
| 5,301,231 | 4/1994 | Abraham et al. . |
| 5,319,705 | 6/1994 | Halter et al. . |
| 5,337,357 | 8/1994 | Chou et al. . |
| 5,339,091 | 8/1994 | Yamazaki et al. . |
| 5,345,588 | 9/1994 | Greenwood et al. . |
| 5,347,578 | 9/1994 | Duxbury . |
| 5,369,702 | 11/1994 | Shanton . |
| 5,386,469 | 1/1995 | Yearsley et al. . |
| 5,386,471 | 1/1995 | Bianco . |
| 5,388,156 | 2/1995 | Blackledge, Jr. et al. . |
| 5,392,351 | 2/1995 | Hasebe et al. . |
| 5,394,469 | 2/1995 | Nagel et al. . |
| 5,400,403 | 3/1995 | Fahn et al. . |
| 5,410,598 | 4/1995 | Shear . |
| 5,432,849 | 7/1995 | Johnson et al. . |
| 5,438,508 | 8/1995 | Wyman . |
| 5,442,541 | 8/1995 | Hube et al. . |
| 5,450,489 | 9/1995 | Ostrover et al. . |
| 5,457,746 | 10/1995 | Dolphin . |
| 5,473,687 | 12/1995 | Lipscomb et al. . |
| 5,504,814 | 4/1996 | Miyahara . |
| 5,530,235 | 6/1996 | Stefik et al. . |
| 5,574,648 | 5/1998 | Ryan et al. . |
| 5,592,549 | 1/1997 | Nagel et al. ............................. 380/4 |
| 5,594,491 | 1/1997 | Hodge et al. . |
| 5,594,936 | 1/1997 | Rebec et al. . |
| 5,615,264 | 3/1997 | Kazmierczak et al. . |
| 5,629,980 | 5/1997 | Stefik et al. . |
| 5,638,443 | 6/1997 | Stefik et al. . |
| 5,646,992 | 7/1997 | Subler et al. . |
| 5,671,276 | 9/1997 | Eyer et al. . |
| 5,673,316 | 9/1997 | Auerbach et al. ...................... 380/4 |
| 5,677,953 | 10/1997 | Dolphin . |
| 5,703,951 | 12/1997 | Dolphin . |
| 5,754,649 | 5/1998 | Ryan et al. . |
| 5,787,172 | 7/1998 | Arnold . |
| 5,796,839 | 8/1998 | Ishiguro . |
| 5,870,474 | 2/1999 | Wasilewski et al. . |
| 5,892,900 | 4/1999 | Ginter . |
| 5,910,987 | 6/1999 | Ginter . |

FOREIGN PATENT DOCUMENTS

| | | |
|---|---|---|
| 2236604 | 4/1991 | (GB) . |
| 9500355-4 | 8/1996 | (SE) . |
| WO9220022 | 11/1992 | (WO) . |
| WO93/01550 | 1/1993 | (WO) . |
| 96/27155 | 9/1996 | (WO) . |

OTHER PUBLICATIONS

Clark, P.C. and Hoffman, L.J., "Bits: A Smartcard Protected Operating System," Communications of the ACM, Nov. 1994, vol. 37, No. 11, pp. 66–70, and 94.

Saigh, W.K., "Knowledge is Sacred," Video Pocket/Page Reader Systems, Ltd., 1992.

Kahn, R.E., "Deposit, Registration And Recordation In an Electronic Copyright Management System," Corporation for National Research Initiatives, Virginia, Aug. 1992, pp. 1–29.

Hilts, P. Mutter, J., and Taylor, S., "Books While U Wait," Publishers Weekly, Jan. 3. 1994, pp. 48–50.

Strattner, A., "Cash register on a chip" may revolutionize software pricing and distribution; Wave Systems Corp., Computer Shopper. Copyright, Apr. 1994, vol. 14; No.4; p. 62.

O'Conner, M.A., "New distribution option for electronic publishers; iOpener data encryption and metering system for CD–ROM use; Column," CD–ROM Professional Copyright, Mar. 1994, vol. 7; No. 2; p. 134; ISSN:1049–0833.

Willett, S., "Metered PCs:Is your system watching you?"; Wave Systems beta tests new technology, InfoWorld, Copyright, May 2, 1994, p. 84.

Linn, R.J., "Copyright and Information Servicces in the Contest of the National Research and Education Network," IMA Intellectual Property Project Proceedings, Jan. 1994, vol. 1, Issue 1, pp. 9–20.

Perritt, Jr., H.H., "Permissions Headers ad Contract Law," IMA Intellectual Property Project Proceedings, Jan. 1994, vol. 1, Issue 1, pp. 27–48.

Upthegrove, L., and Roberts, R., "Intellectual Property Header Descriptors: A Dynamic Approach," IMA Intellectual Property Project Proceedings, Jan. 1994, vol. 1, Issue 1, pp. 63–66.

Sirbu, M.A., "Internet Billing Service Design and Prototype Implementation, IMA" Intellectual Property Project Proceedings, Jan. 1994, vol. 1, Issue 1, pp. 67–80.

Simmel, S.S., and Godard, I., "Metering and Licensing of Resources: Kala's General Purpose Approach," IMA Intellectual Property Project Proceedings, Jan. 1994, vol. 1, Issue 1, pp. 81–110.

Kahn, R.E., "Deposit, Registration and Recordation in an Electronic Copyright Management System," IMA Intellectual property Project Proceedings, Jan. 1994, vol. 1, Issue 1, pp. 111–120.

Tygar, J.D., and Bennet, Y., "Dyad: A System for Using Physically Secure Coprocessors," IMA Intellectual Property Project Proceedings, Jan. 1994, vol. 1, Issue 1, pp. 121–152.

Griswold, G.N., "A Method for Protecting Copyright on Networks," IMA Intellectual Property Project Proceedings, Jan. 1994, vol. 1, Issue 1, pp. 169–178.

Nelson, T.H., "A Publishing and Royalty Model for Networked Documents," IMA Intellectual Property Project Proceedings, Jan. 1994, vol. 1, Issue 1, pp. 257–259.

European Search Report for Corresponding European Application 95308420.9.

U. Flasche et al., Decentralized Processing of Documents, Comput. & Graphics, vol. 10, No. 2, 1986, pp. 119–131.

R. Mori et al., Superdistribution: The Concept and the Architecture, The Transactions of the IEICE, vol. E 73, No. 7, 1990, Tokyo, JP, pp. 1133–1146.

Rosse, P.E., "Data guard", Forbes, Jun. 6, 1994, pp. 101.

Xiao–Wen Yang et al., Key distribution system for digital video signal, ICSP '96. 1996 3rd International Conference on Signal Processing Proceedings (Cat. No. 96TH8116), vol. 2 1996, pp. 847–50.

E.A.I. Claus, Digital network for video surveillance and video distribution, Proc. SPIE—Int. Soc., Opt. Eng. vol. 2952 1996, pp. 194–204.

R. J. Bankapur et al., Switched digital video access networks, Bell Labs Tech. J. vol. 1 No. 1 Summer 1996, pp. 66–77.

C.A. Mandel et al., Intellectual access to digital documents:joining proven principles with new technologies, Cat. Classif. Q., vol. 22, No. 3–4 1996, pp. 25–42.

B.J. Goldsmith et al., Digital video distribution and transmission, International Broadcasting Convention (Conf. Publ. No. 428) 1996, pp. 26–31.

D. Van Schooneveld, Standardization of conditional access systems for digital pay television, Philips, J. Res. (UK), vol. 50, No. 1–2, 1996, pp. 217–25.

H.D. Wactlar, Intelligent access to digital video: Informedia projectComputer, vol. 29, No. 5, May 1996, pp. 46–52.

J.E. Dail et al., Adaptive digital access protocol: A MAC protocol for multiservice broadband access networks INS, IEEE Commun. Mag. vol. 34, No. 3, Mar. 1996, pp. 104–12.

S. Stevens et al., Informedia: improving access to digital video—Ins, Interactions, vol. 1, No. 4, Oct. 1994, pp. 67–71.

B. Hein et al., RACE 1051: a multigigabit transport and distribution technology for provision of digital video services—INS, Proc. SPIE—Int. Soc. Opt. Eng., vol. 1974, 1993, pp. 26–33.

Chen Ching–Chin et al., Analog, digital and multimedia: implications for information access INS, Online Information 91. 15th International Online Information Meeting Proceedings, 1991, pp. 283–92.

Abrams, M.D. et al, "Cryptography", Information Security—An Integrated Collection of Essays, Abrams M.D. et al eds., IEEE Computer Society Press 1995, pp. 350–384.

Choudhury, A.K. et al, "copyright Protection for electronic Publishing Over Computer Networks", IEEE Network, May/Jun. 1995, pp. 12–20.

Ciciora, W.S., "Inside the Set–Top Box", IEEE Spectrum, Apr. 1995, vol. 32, No. 4, pp. 70–75.

Department of Defense Standard, Department of Defense Trusted Computer System Evaluation Criteria, DOD 2500.28–STD,GPO 1986–623.

Marshall Abrams, et al, Generalized Framework For Access Control, Towards Prototyping the ORGCON Policy, Oct. 1991, pp. 1–20, Proc 1991 Nat'l Computer Security Conf.

Marshall D. Abrams, et al, Mediation and Separation in Contemporary Information Technology Systems, 1992, pp. 1–15, Proc. 1991 Nat'l Compute Security Conf.

Marshall D. Abrams, et al, Generalized Framework for Access Control: A Formal Rule Set for The ORGCON Policy, MITRE, Apr. 1992, pp. 1–58.

Marshall D. Abrams, Renewed Unserstanding of Access Control Policies, 1993, pp. 1–10, Proc. 16th National Computer Security Conference.

Leonard J. LaPadula, A Rule–Set Approach to Formal Modeling of a Trusted Computer System, Computing Systems Journal, Winter 1994, vol. 7, No. 1, pp. 113–167, pp. 1–38.

Graubart, R., "On the Need for a third form of Access control", Proceedings of the 12th National Computer Security Conference, 1989, pp. 296–303.

K. Brunnstein and P. P. Sint, eds., KnowRight'95, Intellectual Property Rights and New Technologies: Proceedings of the KnowRigt'95 conference, austrian Computer.

Low, S.H. et al, "Document Marking and Identification using both Line and Word shifting", 1995 INFOCOM Proceedings, IEEE, 1995, pp. 853–860.

McCollum, C.J. et al, "beyond the Pale of MAC and DAC:Defining New Forms of Access Control", Proceedings of the Symposium on Research in Security and Privacy, IEEE Computer Society Press, 1990, pp. 190–200.

National Institute of Standards and technology (NIST) and National Security Agency (NSA), Federal Criteria for Information Technology Security: vol. 1, Protection Profile Development, vol. 11, Registry of Protection Profiles, Version 1.0, Dec. 1992.

Samuelson, P., "Copyright and Digital Libraries", Communications of the AMC, Apr. 1995, vol. 38, No. 3, pp. 15–20 & 110.

Samuelson, P. et al, "A Manifesto Concerning the Legal Protection of Computer Programs", Columbia Law Review, vol. 94, No. 8, pp. 2308–2431.

Sandhu, R.S. "The Typed Access Matrix Model", Proceedings of the Symposium on Research in Security and Provacy, IEEE Computer Society, 1992, pp. 122–136.

Sandhu, R.S. et al., "Implementation Considerations for the Typed Access Marix Model in a Distributed Environment", Proceedings of the 15th National Computer Security Conference, 1992b, pp. 221–235.

Yee, B., "Using Secure Coprocessors", Carnegie Mellon University, School of Computer Science, CMU–CS–94–149, May 1994, (also available Defense Technical Information Center as AD–A281 255).

Maxem Chuk, N.F., Sep. 1994, "Electronic Document Distribution," AT&T technical Journal, pp. 73–80.

* cited by examiner

*Fig. 3*

| 116 |
|---|
| Version number 127 |
| Authentication (hash) 128 |
| License number of these rules 130 |
| Intellectual property identifier 132 |
| First valid generation of the product 134 |
| Last valid generation of the product 136 |
| Encrypted data key 138 |
| Standard permissions 140 |
| Extended permissions 142 |
| Custom permissions 144 |
| Co-requisite rules (permissions) for source data 145 |
| Token/biometrics 146 |
| System IDs/Public keys 147 |

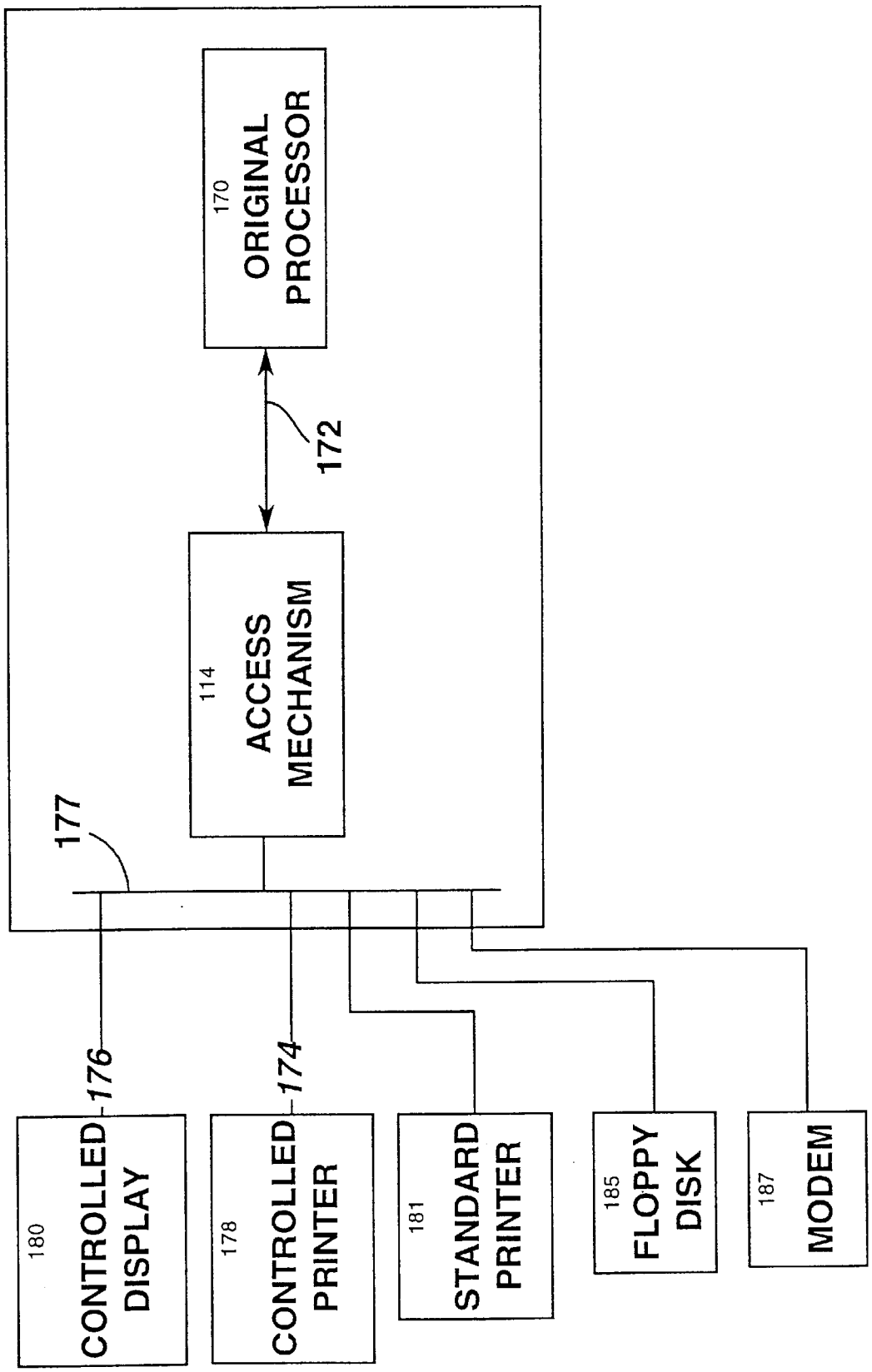

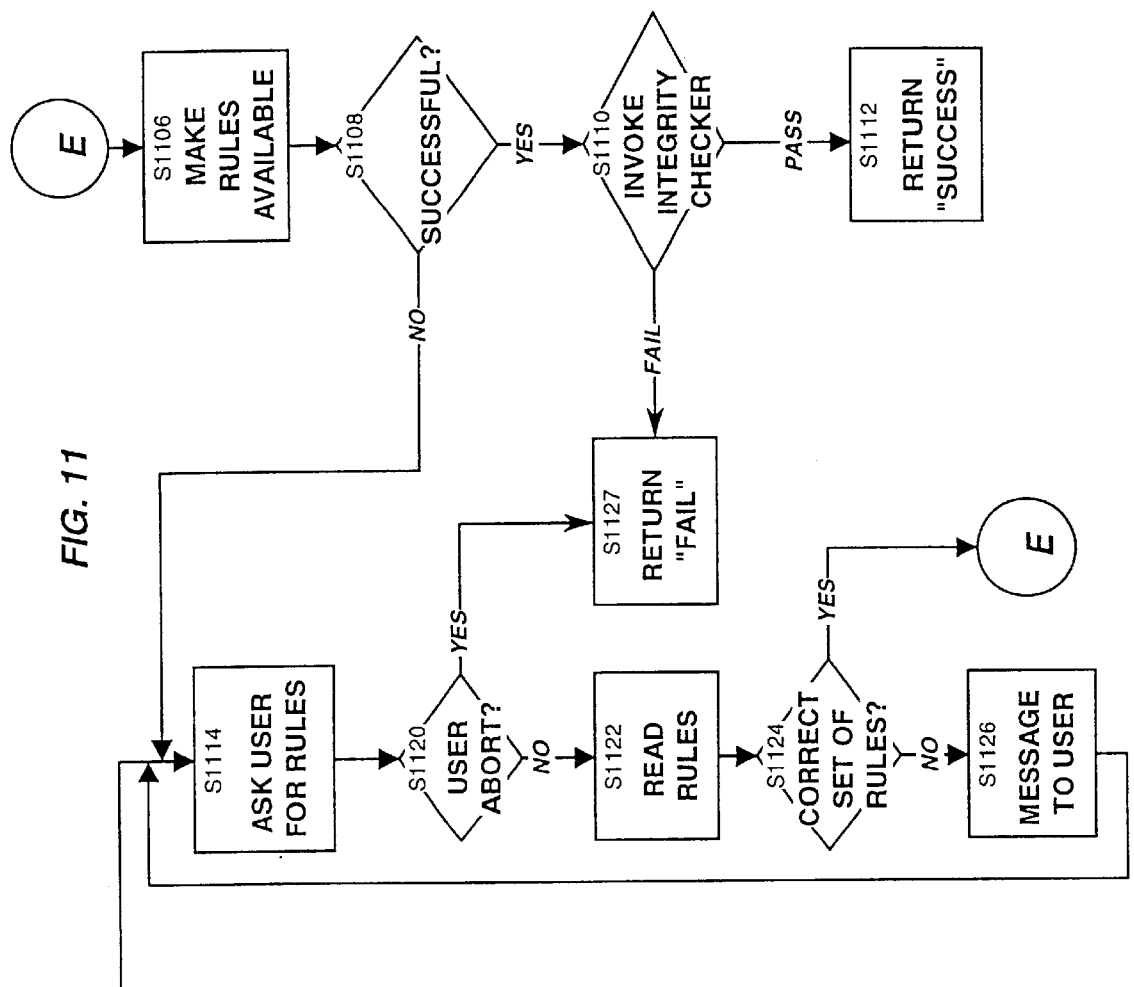
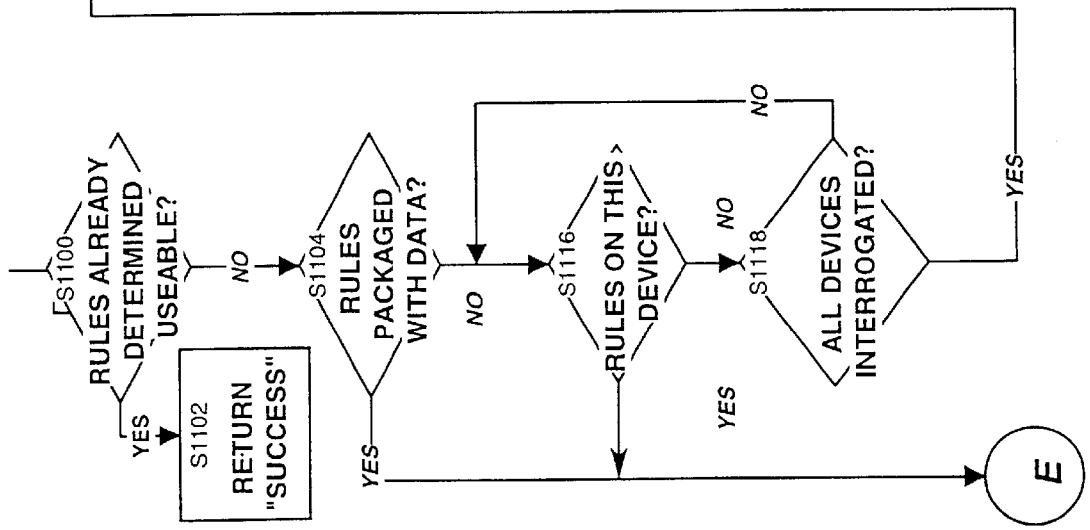
FIG. 11

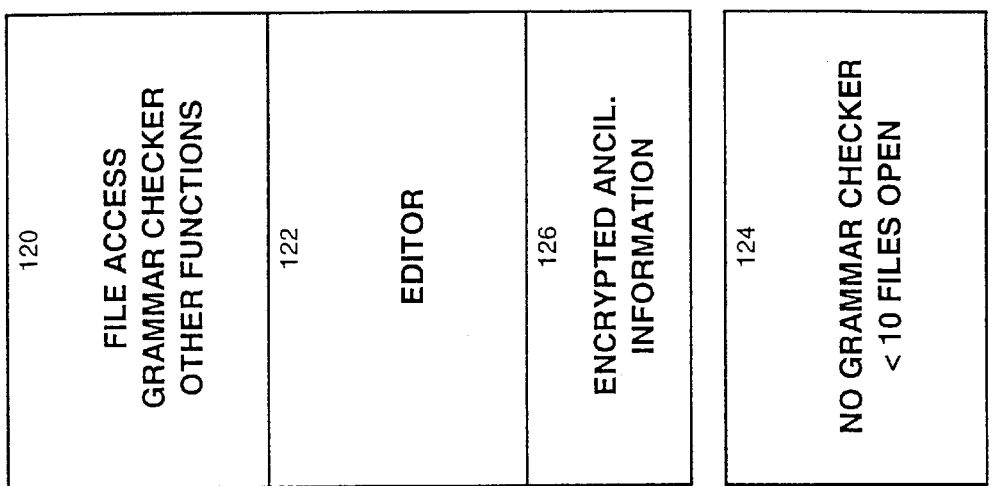
FIG. 20(b)
FIG. 20(c)
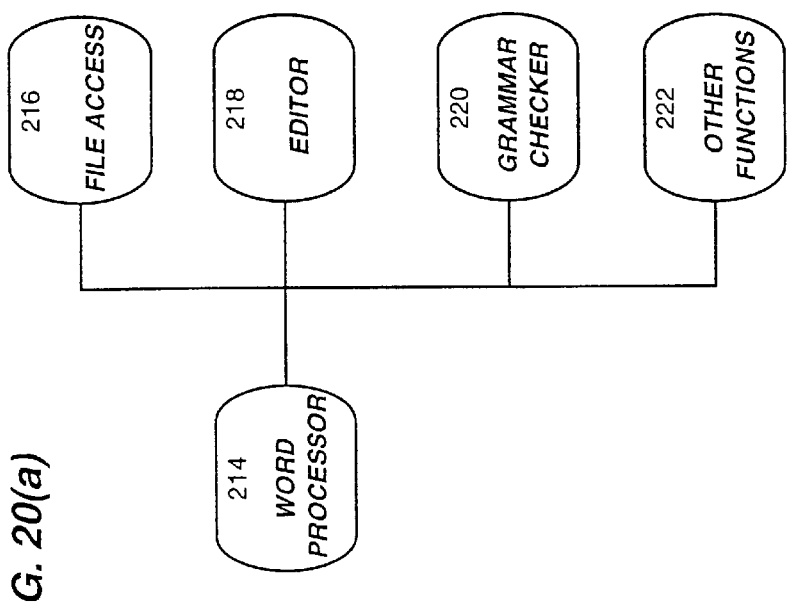
FIG. 20(a)

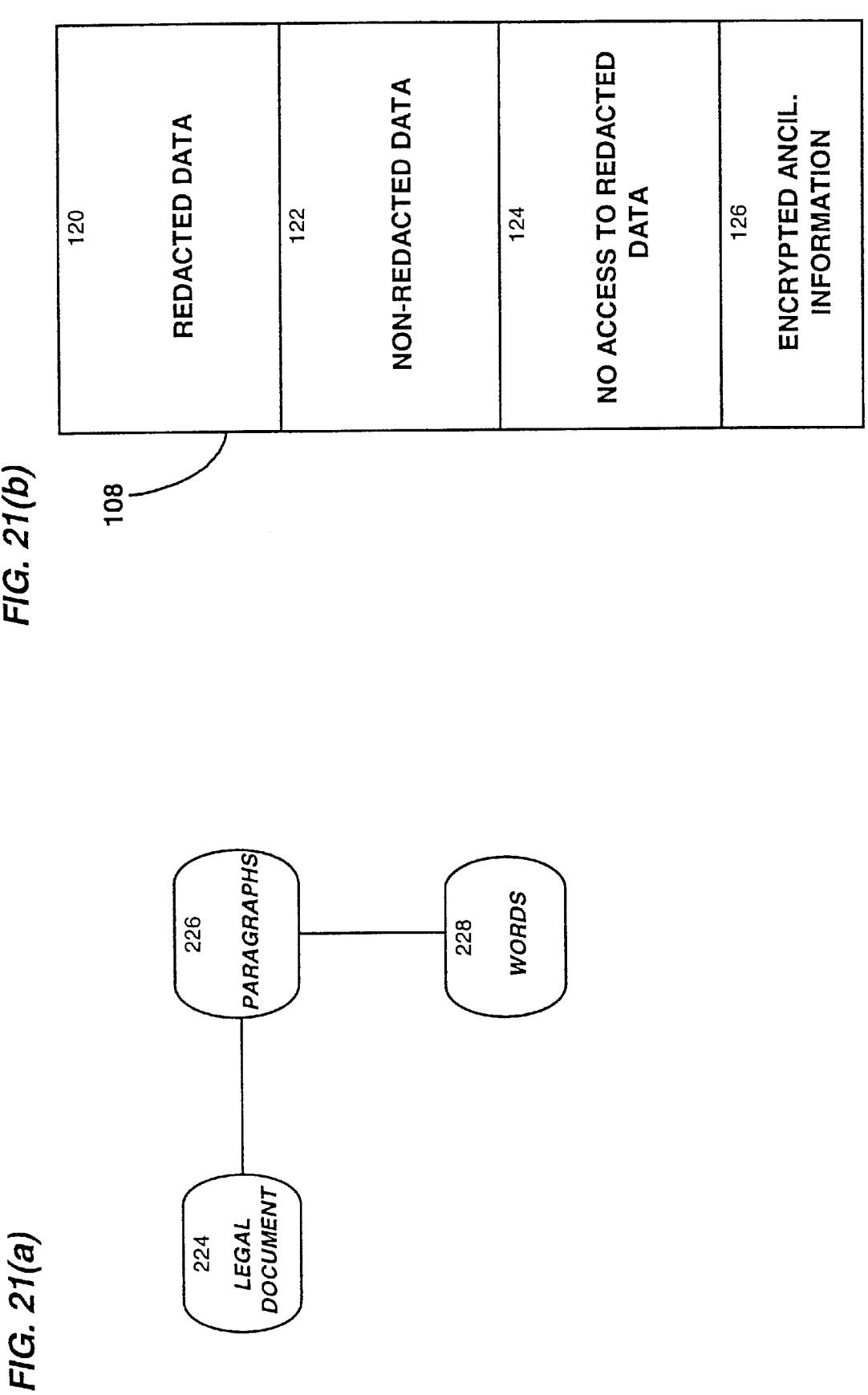

SYSTEM FOR CONTROLLING ACCESS AND DISTRIBUTION OF DIGITAL PROPERTY

This is a division of application Ser. No. 08/968,887, filed Nov. 5, 1997 which is a continuation of Ser. No. 08/584,493, filed Jan. 11, 1996, now abandoned.

1. FIELD OF THE INVENTION

This invention relates to the control of distribution and access of digital property as well as to the payment therefor.

2. BACKGROUND OF THE INVENTION

The development and deployment of digital information networks is accompanied by new concerns for the protection of rights to data and information. The U.S. Congress Office of Technology Assessment identified the following key developments relevant to the area of this invention: there has been an overall movement to distributed computing; boundaries between types of information are blurring; the number and variety of service providers has increased. *Information Security and Privacy in Networked Environments*, Congress, Office of Technology Assessment, OTA-TCT-606, Washington, DC: U.S. Government Printing Office, September 1994.

Computer networks allow more interactivity; and, most significantly, electronic information has opened new questions about copyright, ownership, and responsibility for information. Technology, business practice, and law are changing at different rates, law arguably being the slowest.

Intellectual property, or information, is different from real property. A major difference between intellectual property and real property is that intellectual property can be embodied in forms which can be copied from the owner while the owner still retains the original. For example, a broadcast or performance of a musical composition can be recorded (and copies made of the recording) while the composer retains the original composition; a photograph can be reproduced while the owner retains the original negative.

In the past, when information was stored in analog form, the copying and redistribution of such information, while problematic, did not account for as much economic loss as is possible today. The storage of information in analog form uses a physical medium that is made to have some characteristic vary in proportion with the information to be stored. For instance, the groove on a vinyl record captures the frequency and intensity (volume) of a sound by the extent of its excursion. At each stage in the process of playing a record: the stylus tracing the groove, generation of a small voltage, amplification of the voltage, and reproduction of the sound, small errors are introduced. Today's high fidelity systems are very accurate, but they are not flawless.

Indeed, copying a vinyl record to a cassette tape results in a small, but noticeable, reduction in sound quality. If multiple generations of recording (e.g., cascaded recordings) were undertaken, the resulting product would be noticeably inferior to the original. Similarly, when multiple generations of photocopies of an image are made, the quality of the resulting image is typically poor, with many dark and light areas that were not present in the original image.

It is the inevitable gradual degradation of quality that has proven to be a practical disincentive to large scale copying of analog information. Notwithstanding this observation, where the potential profits are high, such copying is undertaken even though the resulting product's quality is significantly below that of the original. Videotape copies of movies represent a good example. Some fraction of the marketplace is willing to accept a lower quality product in exchange for a significantly lower price. The logistics associated with making large numbers of copies (an inherently serial process), including obtaining the raw materials (cassettes), the reproduction equipment, and the distribution channels also have served to limit illicit production. Finally, the quality of the product as well as the markings on the package distinguish it from the original and may also serve as a disincentive (for some) to purchase an illicit copy.

Just as the invention of the printing press changed the way in which society interacted with information on paper, the technical advances in digital computers and communications in the closing years of the twentieth century have a potential for high impact on legal, moral, and business practice. The printing press is often credited as an enabling mechanism for the Renaissance and the Reformation in Europe. The advances in digital information technology will similarly impact commerce and law. Digital technology enables changing the representation of information without changing the content. (Of course the content can be changed too.)

The storage of information in digital form depends on the ability to encode information in binary form to arbitrary precision and to record that binary form in a physical medium that can take on two distinct characteristics. Preserving the fidelity of information recorded in binary (using media with two distinct and easily-differentiated characteristics) is easily accomplished. For instance, a compact disc stores information (each binary digit or bit) as the presence or absence of a hole (depression or pit) that reflects or does not reflect light. Compared to the analog recording of phonograph records, the information stored in each hole is unambiguously a binary digit, the value of which is either zero or one. No other values are possible. A digital tape stores each bit as a magnetic spot that is oriented either north/south or south/north. Today's digital sound systems use sufficiently many bits to capture sound levels beyond the ability of the human ear to distinguish a difference and in so doing attain so-called "perfect" fidelity.

A digital file can be copied with no loss of fidelity (as the mechanism need only distinguish between two easily-differentiated states). With straightforward and well-known error-correction mechanisms, even inevitable flaws can be made so improbable as to occur fewer than once in ten billion bits.

As a result of the ability to copy a file with no loss of fidelity, it is now almost impossible to differentiate a digital copy from the digital original. In a network environment recording materials, reproduction equipment and distribution are not impediments to copying. Consequently, in the digital domain the threshold inhibiting the making of illicit copies is significantly lowered. Evidence that this is the case is presented by the Software Publishers Association and by the Business Software Alliance, each of which indicates that billions of dollars of software is pirated (in the sense of being illicitly copied) each year. Additionally, print publishers hesitate to expand into the network marketplace because they are unable to control (in the sense of receiving compensation in return for rights) secondary distribution of their products as well as incorporation of their products into derivative products. Digitally stored information may include binary data, computer software, text, graphics, audio, and video. The uses of this information include news, entertainment, education, and analysis. Information may be distributed in many ways, including networks, magnetic media, CD-ROM, semiconductor memory modules, and wireless broadcast.

Copying and distributing large volumes of digital information over long distances is becoming easier and less costly. Such changes in cost and convenience of necessity impact business decisions concerning producing, distributing, promoting, and marketing. The commercial relationship among information producers (such as authors, performers, and artists), distributors (such as publishers, promoters, and broadcasters), and consumers must change in response to the technology.

The law concerning intellectual property is in ferment. Major revisions in the laws regarding the protection of computer programs have been suggested. *A Manifesto Concerning the Legal Protection of Computer Programs*, Samuelson, P. R. et al., *Columbia Law Review*, vol. 94, no. 8, pp. 2308–2431, December 1994. The European Union is working on harmonizing protection of intellectual property rights with respect to technology and differences in civil and common law countries. Commission of the European Union, Jul. 19, 1995, *Green Paper on Copyright and Neighboring Rights in the Information Society*, catalogue number CB-CO-95-421-EN-C, ISSN 0254-1475, ISBM 92-77-92580-9, Office for Official Publications of the European Communities, L-2985 Luxembourg. In the United States, the issue of protection of intellectual property rights is being addressed in the context of the National Information Infrastructure. The uncertainty of legal protection over time and from country to country only serves to emphasize the importance of and need for technical protection of intellectual property rights in information and data.

The principal technology which has been used for protecting intellectual property is cryptography. However, devising practical retail systems for delivery of intellectual property from distributor to consumer, as distinct from confidential transmission in national security and business activities among trusted and cleared personnel, has required innovation.

Executable software-based cryptography can ensure that data are distributed only to authorized users. The information to be protected is encrypted and transmitted to the authorized user(s). Separately, a decryption key is provided only to authorized users. The key is subsequently used to enable decryption of the information so that it is available to the authorized user(s).

Other ways of controlling access to portions of data or software have included the use of external devices or tokens (dongles) needed in order to access the data or selected features of a program. Possession of the token is made evident to the computer system by physical attachment of the token to the computer. A token is generally attached to a printer, game, or network port where executable software can check on its presence prior to authorizing access. Diskettes have also been used as dongles; their presence in the diskette drive is checked by the executing software. Because they must be actively interrogated, dongles are generally used to limit access to program features and not to limit access to information.

Of those prior art systems which make some use of encryption, none protects the data after it has been decrypted. Thus, secondary distribution and multiple uses are possible.

Further, in all of the prior art, access is all or nothing, that is, once access is granted, it cannot be controlled in any other ways. This makes it difficult to control copying, secondary distribution, as well as to obtain payment for all uses.

Originator controlled data dissemination is desirable. Several policies for control of dissemination of paper documents are specified in *Control of Dissemination of Intelligence Information*, Directive No. 1/7, Director of Central Intelligence, 4 May 1981. This Originator-Controlled (ORCON) policy has motivated development of computerized access controls. ORCON requires the permission of the originator to distribute information beyond the original receivers designated by the originator. The Propagated Access Control (PAC) policy and the related Propagated Access Control List (PACL) were proposed as one way of implementing ORCON. "On the Need for a Third Form of Access Control," Graubart, R., *Proceedings of the 12th National Computer Security Conference*, pp. 296–303, 1989. Whenever an authorized subject reads an object with an associated PACL, that PACL becomes associated with the subject. Any new object created by the subject inherits the PACL. PACLs are associated with both subjects and objects.

Owner-Retained Access Control (ORAC) (described in "Beyond the Pale of MAC and DAC: Defining New Forms of Access Control," McCollum, C. J., et al. *Proceedings of the Symposium on Research in Security and Privacy*, IEEE Computer Society Press, 1990) is similar to PAC in propagating ACLs with non-discretionary enforcement. ORAC goes further, retaining the autonomy of all originators associated with a given object in making access decisions, while basing mediation of requests on the intersection of the access rights that have been granted. ORAC is motivated to implement several of the DCID 1/7 policies in addition to ORCON, namely NO_CONTRACTOR, NO_FOREIGN, and RELEASABLE_TO.

Originator-Controlled Access Control (ORGCON) (described in "Generalized Framework for Access Control: Towards Prototyping the ORGCON Policy," Abrams, M. D., et al. *Proceedings of the 14th National Computer Security Conference*, October 1991) is a strong form of identity-based access control—it explicitly defines authority and delegation of authority, provides for accountability, and has an explicit inheritance policy. In ORGCON, the distribution list is indelibly attached to the object (i.e., the distribution list cannot be disassociated from the object, even in the limited cases where copying is permitted). ORGCON is a read, no-copy policy. Its formal model (taught in "A Rule-Set Approach to Formal Modeling of a Trusted Computer System," LaPadula, L. J., *Computing Systems Journal*, Vol. 7, No. 1, pp. 113–167, Winter 1994) distinguishes among device types in order to deal with the policy that no storage copy of an object is permitted. Information may be copied only to the display and printer, but not to any other device types.

The Typed Access Matrix (TAM) Model (described in "The Typed Access Matrix Model," Sandhu, R. S., *Proceedings of the Symposium on Research in Security and Privacy*, IEEE Computer society, pp. 122–136, 1992; and "Implementation Considerations for the Typed Access Matrix Model in a Distributed Environment," Sandhu, R. S., and G. S. Suri, 1992, *Proceedings of the 15th National Computer Security Conference*, pp. 221–235) incorporates strong typing into the access matrix model to provide a flexible model that can express a rich variety of security policies while addressing propagation of access rights and the safety problem. The safety problem is closely related to the fundamental flaw in Discretionary Access Control (DAC) that malicious code can modify the protection state. Types and rights are specified as part of the system definition; they are not predetermined in TAM.

The prior art, including cryptographic processes, tokens, dongles, so-balled "uncopyable" media, various executable software protection schemes, and executable software for printing that places an identifier on all printed output in a fashion not apparent to a human, fails to limit either secondary distribution or distribution of derivative works.

This shortcoming is not a failure of mechanism, but rather it is an architectural design omission. The problem of copying by the authorized user is simply not addressed. In each case, once the data are available to an authorized user, they are basically unprotected and may be copied, modified, or transmitted at will. Schemes that include identifiers on printed material, although they may aid in identifying the source of copied material, do not prevent secondary distribution.

Executable software-based cryptography can ensure that data are distributed only to authorized users. However, once data are received they may be freely manipulated and redistributed.

The information to be protected is encrypted and transmitted to the authorized user(s). In some systems the encrypted information is made freely available. Separately, a decryption key is provided only to authorized users. The key is subsequently used to enable decryption of the information so that it is available to the authorized user(s). It is at this point that the information is subject to manipulation and redistribution without further limitation.

As mentioned above, a dongle or token can be used to authorize access to executable software. However, once access has been granted to information that information is subject to manipulation and redistribution without further limitation. Further, dongles have proven to be unpopular because of the need to keep track of them and ensure that they are separately secured.

Uncopyable media, generally used either to control distribution of information or to control usage of executable software, are unpopular because of the user's inability to create a backup copy. Further, most so-called uncopyable disks have fallen victim to general-purpose duplication programs, rendering their protection useless. Sometimes, as in early releases of Lotus 1-2-3, an uncopyable disk was provided with the executable software release and had to be inserted in a floppy-disk drive for the executable software to function (operating as a disk dongle). Users soon learned how to by-pass the executable software so that the disk need not be present. Even where partially effective, the uncopyable disk did not serve as a deterrent to capturing information and redistributing it.

The degree of protection of data is typically made by the data owners and/or distributors based on their security analysis. It is common to perform security analysis in terms of risks, threats, vulnerabilities, and countermeasures. An owner's estimate of the probability that a particular threat will materialize is crucial to selecting appropriate rules to protect property rights.

Threat can be characterized as the intensity of attack on the data, which can be described as low, medium, and high.

| | |
|---|---|
| Low | For a security function to be rated as "suitable for use in a low threat environment," it shall be shown that the security function provides protection against unintended or casual breach of security by attackers possessing a low level of expertise, opportunities, resources and motivation. However, such a security function may be capable of being defeated by a knowledgeable attacker. |
| Medium | For a security function to be rated as "suitable for use in a medium threat environment," it shall be shown that the security function provides protection against attackers possessing a moderate level of expertise, opportunities, resources and motivation. |
| High | For a security function to be rated as "suitable for use in a high threat environment," it shall be shown that the security function provides protection against attackers possessing a high level of expertise, opportunity, resources and motivation. A successful attack is judged as being beyond normal practicality. |

The following list covers some common anticipated threats to data and processing systems.

Threat: Capture of Output Signal

No matter what method is used to protect a data file, the data stored therein can be captured as a signal en route to an output device. Capture of an analog output results in some degradation of signal quality. But the market for bootleg copies of videos, for example, appears to be insensitive to such quality if the price is right. A captured digital signal suffers degradation of quality only as a result of bit errors (i.e., if the data capture was not completely accurate).

This threat is well known to the entertainment industry. Various approaches to protection have been incorporated in set-top boxes discussed in "Inside the Set-Top Box," Ciciora, W. S., *IEEE Spectrum*, pp. 70–75, April 1995.

Threat: Digital Copying

Once data have been decrypted, the resulting cleartext must be protected from unauthorized copying. Creating an unauthorized local copy, or disseminating the data without authorization each results in an original-quality copy without compensation to the owner.

Threat: Deliberate Attack Via Legacy (Pre-Existing) and Customized Hardware

High-intensity attack by attackers possessing a high level of expertise, opportunity, resources and motivation must be considered. Attackers in this category might include foreign governments and industrial espionage agents, teenage crackers, and resellers of pirated intellectual property. One manifestation of this threat is in uncontrolled hardware. The nominally protected information would be available in the memory and could be accessed via dual-ported memory or even by DMA (direct memory access) from a peripheral.

A strong indication of the usefulness and desirability of the present invention can be found in the legislation pending before the U.S. Congress to make illegal the by-passing or avoiding of copyright protection schemes. See S.1284, 104th Congress, 1st sess. (1995).

It is desirable to have a system of distributing data (intellectual property) that prevents copying, restricts re-distribution of the data and provides controlled access to the data.

SUMMARY OF THE INVENTION

This invention controls access to and use and distribution of data.

For example, when the data are in the form of textual and graphical information, this invention can control how much of the information is displayed and in what form; or, when the data represents a computer software program, this invention can control how much of the software's functionality is available. Classified data are similarly controlled.

In addition, this invention controls secondary distribution and creation of derivative works. Prior art systems rely on software for security. Without the tamper detection/reset mechanism of this invention, software can be modified or data can be intercepted rendering useless any attempts at control.

Degrees of protection utilized in the computer system hardware (for example, tamperproof and tamper-detect features) and the cryptographic tools will depend on the nature of the data to be protected as well as the user environment.

In one preferred embodiment, this invention is a method of controlling access to data by protecting portions of the data; determining rules concerning access rights to the data; preventing access to the protected portions of the data other than in a non-useable form; and permitting a user access to the data only in accordance with the rules as enforced by a tamper detecting mechanism.

In another preferred embodiment, this invention is a device for controlling access to digital data, the digital data comprising protected data portions and rules concerning access rights to the digital data. The device includes storage means for storing the rules; and means for accessing the protected data portions only in accordance with the rules, whereby user access to the protected data portions is permitted only if the rules indicate that the user is allowed to access the portions of the data.

In another aspect, this invention is a method of distributing digital data for subsequent controlled use of the data by a user. The method includes protecting portions of the digital data; preventing access to the protected portions of the data other than in a non-useable form; determining rules concerning access rights to the data; protecting the rules; and providing the protected portions of the digital data and the protected rules. The user is provided controlled access to the data only in accordance with the rules as enforced by a tamper detecting access mechanism.

In another aspect, this invention is a storage device, readable by a machine, tangibly embodying a package of digital data comprising protected portions of digital data; and rules concerning access rights to the digital data, whereby a user is provided controlled access to the digital data only in accordance with the rules as enforced by a tamper detecting access mechanism.

The data represent computer software, text, graphics, audio, and video, alone or in combinations.

The protecting is done by encrypting the portions of the data, and access is prevented to the encrypted portions of the data other than in encrypted form.

In some embodiments the rules are provided with the data, whereas in others the rules are provided separately. The rules can specify various access rights and controls, including rights of further distribution of the data.

In preferred embodiments, data are destroyed when tampering is detected.

The device containing the mechanism of the present invention can be a stand-alone device such as a facsimile machine, a television, a VCR, a laser printer, a telephone, a laser disk player, a computer system or the like.

As noted above, the rules, policies and protections of data are typically made by the data owners and/or distributors based on their security analysis of various threats. The various threats listed above are dealt with by countermeasures in the present invention.

Threat: Capture of Output Signal
    Countermeasure: Encrypt or Scramble Output Signal
    Protection of the output signal is accomplished with encryption of a digital signal (as is done in the present invention) and scrambling of an analog signal. This solution requires installing decryption or unscrambling capability in the output device, TV or monitor, along with appropriate tamper-detection capability. Encryption or scrambling might be effected using a public key associated with the output device (although, to prevent so-called "spoofing," obtained from a certification authority and not from the output device). Alternatively, the output might be encrypted or scrambled using a private key only available to the designated output device (again ensured via some certification mechanism). The output signal is decrypted or unscrambled by the output device using its private key and is not available in plaintext form outside of the device's protected enclosure.
    Countermeasure: Protect Output Signal by Packaging
    The output signal is protected by making it unavailable outside the access mechanism. A sealed-unit computer with tamper detection provides the necessary protection. Examples of the acceptability of such packaging include lap-top computers and the original Macintosh computer, as well as integrated televisions, VCRs and video or audio laser disk players.

Threat: Digital Copying
    Countermeasure: Secure Coprocessor
    Selection of a secure coprocessor is indicated to implement protection against unauthorized use when an operating system (OS) is determined to be untrustworthy—that is, when the OS cannot provide adequate resistance to the anticipated threat. When the OS is untrustworthy, any measures implemented in the OS, or protected by it, can be circumvented through the OS or by-passing it.
    Countermeasure: Detection of Unsealing
    The protection provided by a coprocessor could be circumvented by tampering. The coprocessor is protected by tamper detection that causes the rules, cryptographic data, and decrypted protected data to be destroyed. Both passive and active means are used to effect such destruction. Semiconductor memory is volatile and does not retain data when power is removed. A long-life battery provides energy sufficient to allow rewriting (zeroizing) nonvolatile memory containing, for example, the private key. Without the private key the system will be unable to decrypt any protected data and it must be returned to an authorized service facility for installation of a new private key.

Threat: Deliberate Attack Via Legacy and Customized Hardware
    Countermeasure: Keep the Information on the Coprocessor Board
    Access may be controlled if the information leaves the coprocessor board only for output purposes. Deciphered information is retained in memory on the coprocessor board, not in main memory. Program execution occurs in the coprocessor on the board (e.g, operating in the same manner as did so-called "accelerator" coprocessors that allowed a user to install an 80286 processor in an 80186 system, allowing the user to shift all functions to or from the faster coprocessor using a software command). Where information must leave the coprocessor board, e.g., to be sent to an output device, it may, depending on the associated rules, be encrypted. To receive and process encrypted data, the output device must have an access mechanism as well as public and private keys and tamper detect capability. Because some output peripheral devices do not have the capability of retransmission, the device may be a subset of the full access mechanism associated with a processor or computer system.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which:

FIGS. 2 and 3 show logical data structures used by the system depicted in FIG. 1;

FIGS. 8 and 9 show schematic block diagrams of embodiments of the access mechanism according to the present invention;

FIGS. 10(a)–13 are flow charts of the data access using the access mechanisms shown in FIGS. 8, 9 and 15;

FIGS. 18(a)–23(b) show various examples of data and their packaging according to the present invention.

DETAILED DESCRIPTION OF THE PRESENTLY PREFERRED EXEMPLARY EMBODIMENTS

Figure 1:
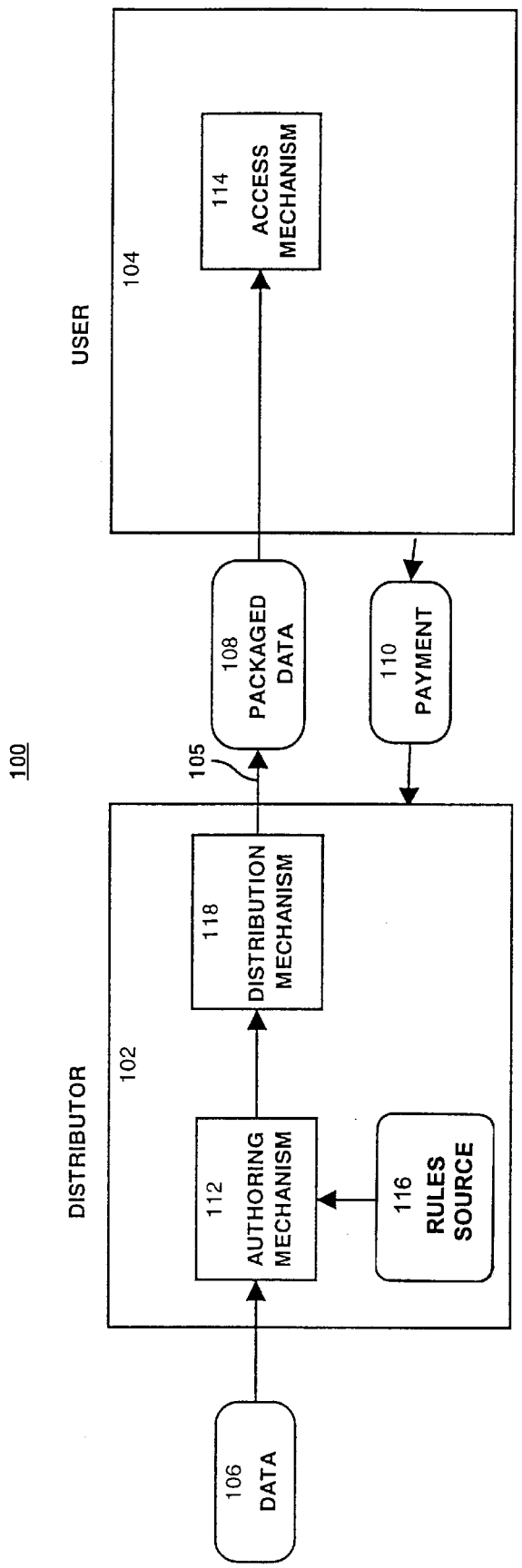
FIG. 1 is a schematic block diagram of an embodiment of a digital data access and distribution system according to the present invention.

A schematic block diagram of a presently preferred exemplary embodiment of a digital data access and distribution system 100 according to the present invention is depicted in FIG. 1. System 100 includes two main components: a data distributor 102 and a user 104. The data distributor 102 takes data 106 and produces packaged data 108 which are provided to the user 104 via communication channel 105, perhaps in return for some form of payment 110.

Figure 5:
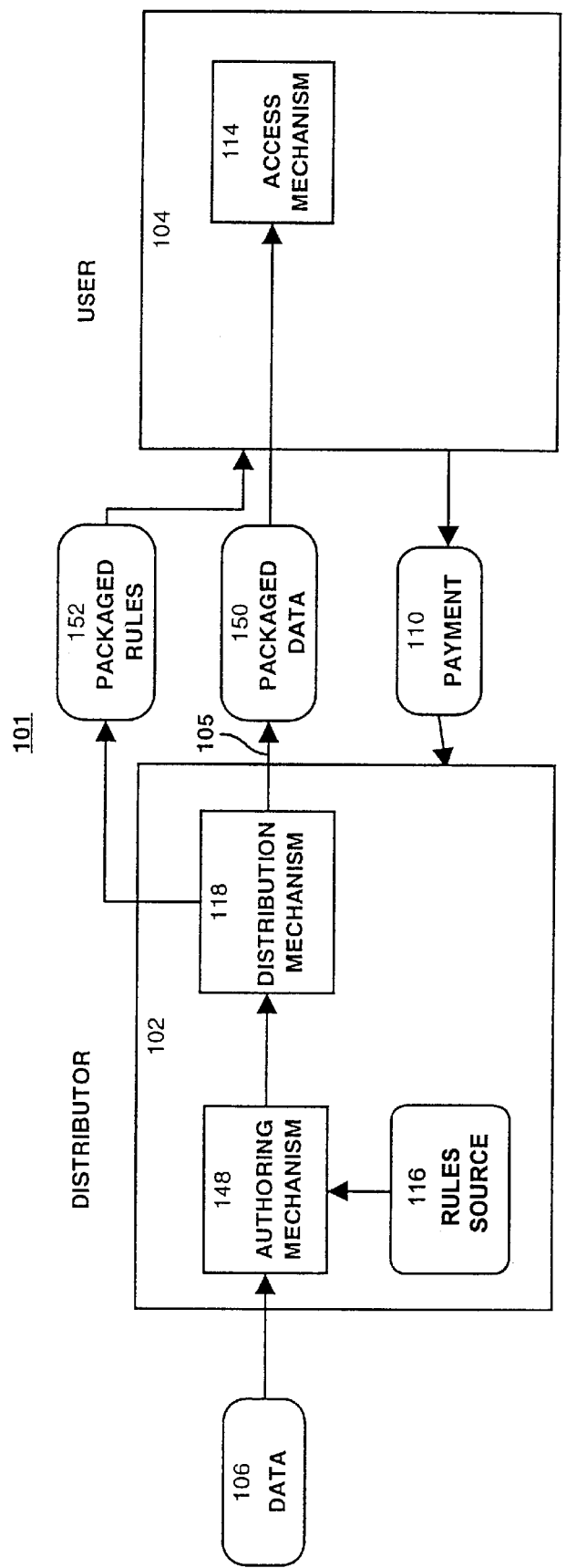
FIG. 5 is a schematic block diagram of another embodiment of a digital data access and distribution system according to the present invention.

Corresponding to each of the distributor 102 and the user 104 are the system's authoring mechanism 112 and access mechanism 114, respectively. The authoring mechanism 112 of the distributor 102 takes the data 106 to be packaged and produces packaged data 108 which is provided to user 104 by a distribution mechanism 118. The packaged data 108 may include access rules 116 in encrypted form encoded therewith, or the access rules 116 may be provided to the user 104 separately (as shown in the embodiment of FIG. 5).

The access mechanism 114 of the user 104 takes the packaged data 108, either including an encrypted version of the access rules 116 or having the access rules provided separately, and enables the user to access the data in various controlled ways, depending on the access rules.

Data 106 provided to or generated by the distributor 102 can be any combination of binary data representing, for example,.computer software, text, graphics, audio, video and the like, alone or in combinations. As described below (with respect to the embodiment shown in FIG. 15), in some embodiments data 106 can also include other packaged data produced by an authoring mechanism according to this invention.

Figure 15:
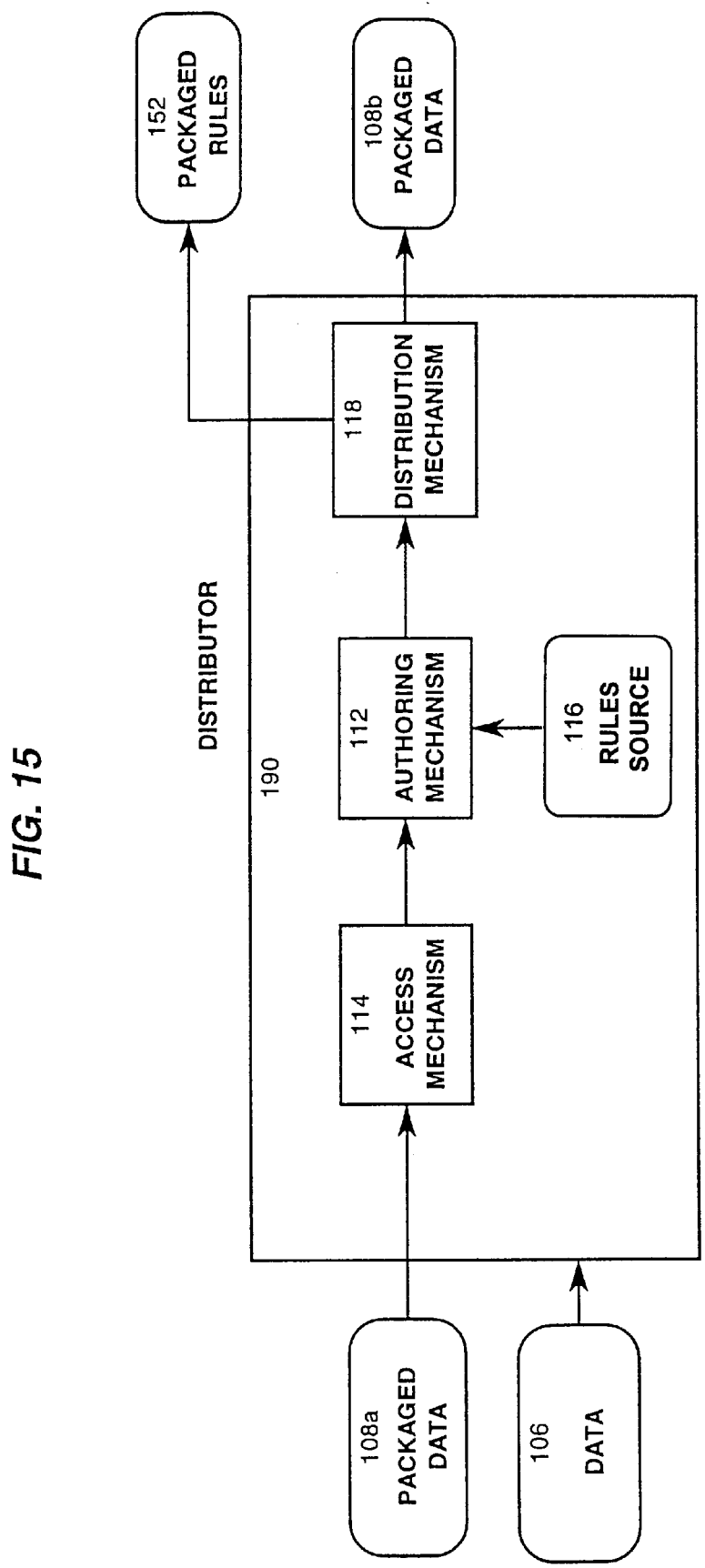
FIG. 15 is a schematic block diagram of an embodiment of a distribution system for derivative works according to the present invention.

The difference between the embodiments of the distributors 102 and 190, shown in FIGS. 1 and 15, respectively, is that the distributor 102 (FIG. 1) does not include an access mechanism 114. Accordingly, distributor 102 deals only with newly created data (that is, with non-derivative data). The embodiment shown in FIG. 15 (discussed below) includes the functionality of the embodiment shown in FIG. 1, and can also deal with input of protected data (previously packaged by a distributor). The embodiment of distributor 102 shown in FIG. 1 can be implemented purely in software (depending on the trust level of the employees of the publisher), whereas the embodiment of distributor 190 shown in FIG. 15 requires some hardware implementation.

Data 106 can also be provided to the distributor in non-digital form and converted to digital form by the distributor in a known and suitable fashion. The content of the data 106 can include, for example, news, entertainment, education, analysis and the like, alone or in combinations.

Note, as used herein, computer software refers to any software program used to control any computer processor. This includes, but is in no way limited to, processors in stand-alone computers; processors in video and audio devices such as televisions, video recorders and the like; processors in output devices such as printers, displays, facsimile machines and the like; and processors in appliances, automobiles, telephones and the like.

The data 106 are typically intellectual property subject to control. In some cases, distributor 102 may receive some form of payment 110 from the user 104 for accessing the data. This payment, or some part thereof, may then be provided directly to the actual owner (not shown) of the data 106. Further, the payment or part thereof may be made before, during or after use of the data.

Figure 2:
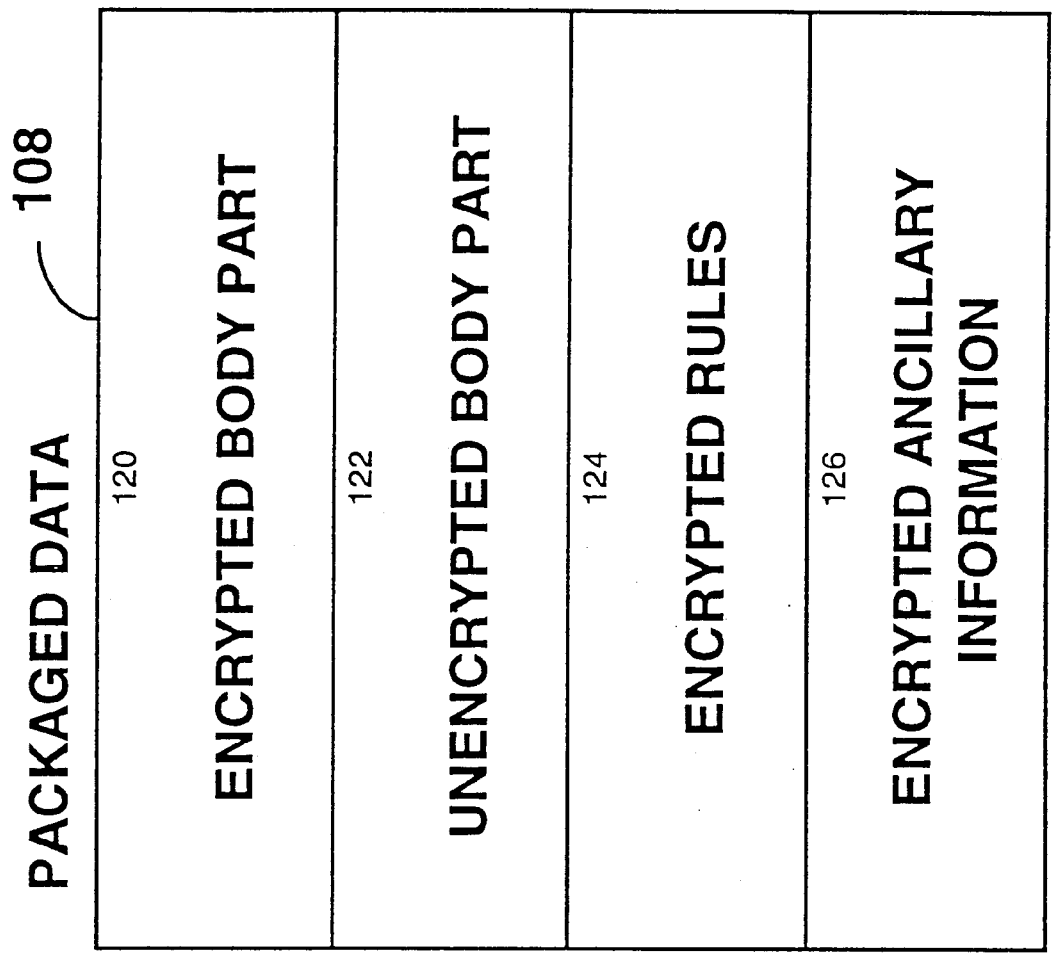

As noted above, the packaged data 108 may include an encrypted version of the access rules 116, or these rules may be provided to the user separately. The logical data structure for the packaged data 108 is shown in FIG. 2 and includes an encrypted body part 120, an unencrypted body part 122, encrypted rules 124 (if provided with the packaged data), and encrypted ancillary information 126. Encrypted rules 124 are an encrypted version of access rules 116.

The actual format and layout of the data is dependent on the type of data, their intended use, the manner in which they are to be accessed and the granularity of control to be exercised on the data. An encyclopedia, for example, would likely be organized differently from a movie or a musical selection. Since the data can be any combination of binary data, different parts of the packaged data 108 may be structured differently, as appropriate. Accordingly, encrypted body part 120 is potentially made up of encrypted body elements, and similarly, unencrypted body part 122 is potentially made up of unencrypted body elements.

It is, however, envisaged that in presently preferred embodiments the data will be structured such that some data parts or elements have header information which enables the data to be traversed or navigated according to whatever rules are to be applied and in a manner appropriate for those data.

An example of the structure of rules 116 is shown in FIG. 3, wherein the rules include various forms of validity checking and identification information such as version number 127, authentication data 128, license number 130, intellectual property identifier 132, first and last valid generations of the product 134, 136. The rules 116 further include an encrypted data key 138 as well as the actual rules 140, 142, 144–146 to be applied when access is made to the data by a user. The actual rules include, but are not limited to, standard, extended and custom permissions 140, 142, 144–146, and co-requisite rules (permission lists) of source data 145.

The function of each field in the rules shown in FIG. 3 is given in TABLE I, below.

TABLE I

| Field | Function |
|---|---|
| Version number 127 | Defines internal configuration template |
| Authentication (hash) 128 | Validates integrity of this data file. |
| License number of these rules 130. | Used by publisher to identify owner. |
| Intellectual property identifier 132. | Identifies the intellectual property product. |
| First valid generation of the product 134. | Defines extent of validity of the license. |
| Last valid generation of the product 136. | Defines extent of validity of the license. |
| Encrypted data key 138. | Key to access the data. |
| Standard permissions 140. | List of basic access permissions for data. |
| Extended permissions 142. | List of extended access permissions for data. |
| Custom permissions 144. | Executable code modules. |
| Co-requisite rules (permissions) for source data 145. | Indicates which source data rules are needed. |
| Token/biometrics 146 | Indicates the physical tokens and/or biometric characteristics (if any) required for identification of each authorized user. |
| System IDs/Public keys 147 | Other systems to which these rules may be redistributed. |

A complete introduction and references to further reading concerning cryptography and cryptographic techniques and mechanisms are found in Abrams, M. D. and Podell, H. J., "Cryptography," *Security-An Integrated Collection of Essays*, Abrams, M. D. et al, eds. IEEE Computer Society Press, 1995, which is hereby incorporated herein by reference.

The Authoring Mechanism

As shown in FIG. 1, the authoring mechanism 112 of the distributor 102 takes data 106 and produces packaged data 108 for distribution. The process of producing the packaged data which includes rules 116 is described with reference to FIGS. 1–4.

The authoring mechanism 112 incorporates existing source data 106 into a packaged format for dissemination. As noted above, data 106 can include but are not limited to combinations of computer software, text, graphics, audio, video and the like. The data 106 may be provided to the authoring mechanism 112 in various proprietary data formats used in vendor software packages as well as having lower level formats for graphics, tables, charts, spreadsheets, text, still and motion pictures, audio and the like.

Using the authoring mechanism 112, those elements of the data 106 that are to be encrypted are selected, as are the cryptographic algorithms and protocols to be employed, the payment procedures for the use of the data, and other decisions governing how the user 104 will be permitted to use the data. These decisions are used in constructing the permission lists to be included in the rules 116. Different classes of users can be defined, based, for example, on age, fee paid, qualifications and the like.

The presently preferred embodiment employs asymmetric encryption algorithms in the authoring and access mechanisms. The keys for these algorithms are protected within the system and are never exposed. The data-encrypting key, $K_D$, is the same for all copies of the data. $K_D$ is selected by the distributor 102 and may be different for each product (i.e., for each packaged data 108). The symmetric encryption algorithm used for encrypting the data is associated with $K_D$ and may also be selected by the distributor. $K_D$ is encrypted using a rule-encrypting key $K_R$. When the rules are distributed with the product (packaged data 108), $K_R$ is the same for all products and all embodiments of the system. When the rules are distributed separately from the product, $K_R$ can be unique for each version of the system. The rule-encrypting key $K_R$ is known only to (and protected within) each receiving computer of each user.

Figure 4:
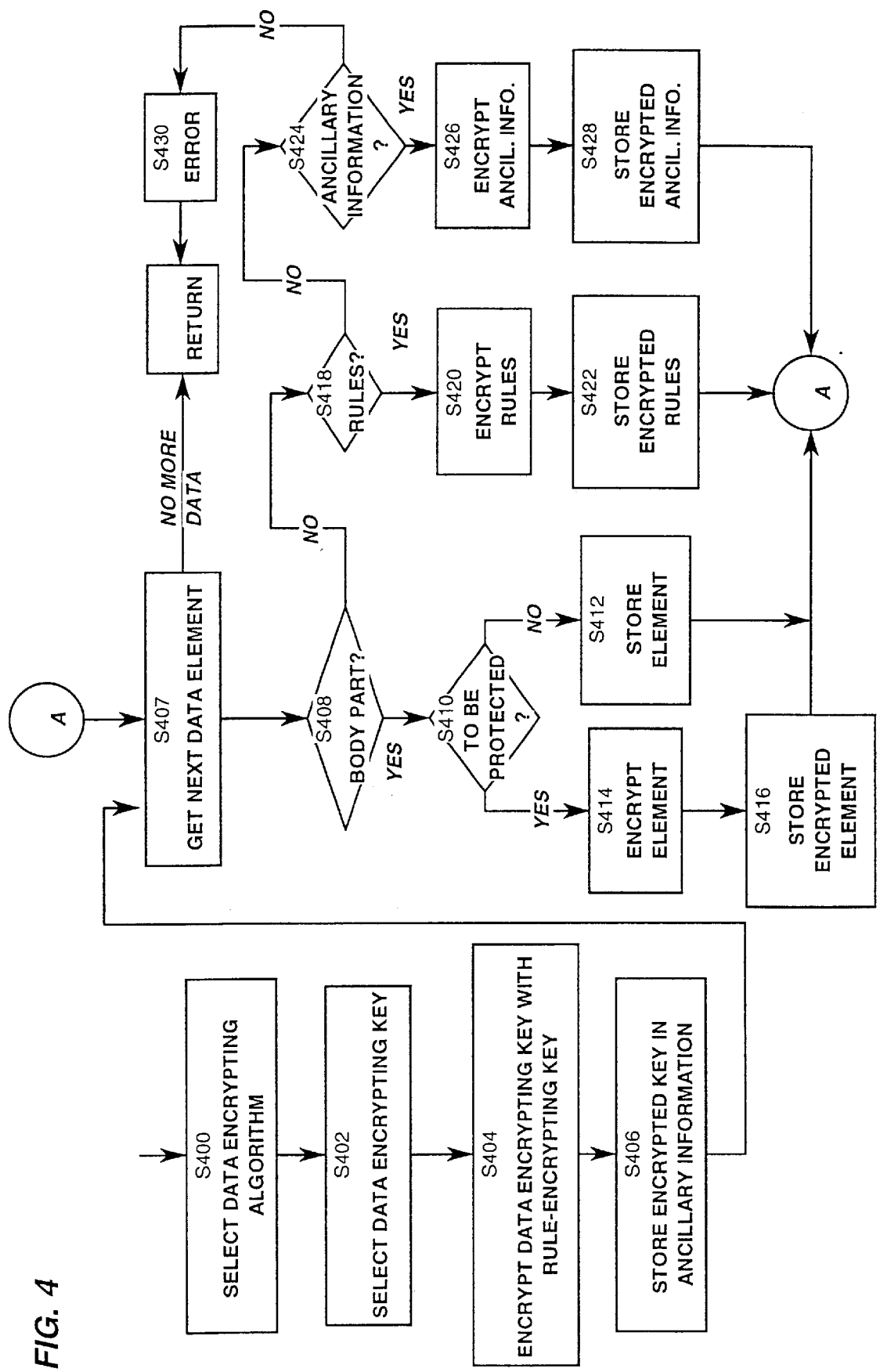
FIG. 4 is a flow chart of the authoring mechanism of the embodiment of the present invention depicted in FIG. 1.

With reference to FIG. 4 which shows a flow chart of a version of the authoring mechanism of the present invention in which the rules are distributed with the packaged data 108, the distributor 102 (acting as a representative of the owner of the data 106) selects a data-encrypting algorithm (DEA) (step S400) and data-encrypting key $K_D$ (step S402), and encrypts the data-encrypting key $K_D$ using $K_R$ (step S404). The encrypted data-encrypting key $K_D$ is then stored in the encrypted ancillary information 126 of the packaged data 108 (in step S406).

The algorithm selection (in step S400) is based on an assessment of risk, the degree of protection desired as well as other factors such as speed, reliability, exportability and the like. As used herein, risk refers to the expected loss due to, or impact of, anticipated threats in light of system vulnerabilities and strength or determination of relevant threat agents. Alternatively, risk can refer to the probability that a particular threat will exploit a particular vulnerability of the system. An analysis of risk, threats and vulnerability is provided below. Examples of possible data-encryption algorithms include, but are not limited to, DES, RSA, PGP and SKIPJACK. The system may use a preferred encryption algorithm and may also provide a mechanism for using algorithms provided with the data 106 by the owner of the data.

The data-encrypting key $K_D$ may be generated in a typical manner, suitable for the selected data-encrypting algorithm. For data having lower value to its owner, or having lower risk of loss, all distributions may rely on a single data-encrypting key (or perhaps a small number of data-encrypting keys). Another encryption method, uses a unique data-encrypting key for each item of data to be distributed.

Having selected a data-encrypting algorithm and key, $K_D$, (S400–S402) and having encrypted and stored the key (S404–S406), the distributor 102 proceeds to process the various elements of the data 106. The data are processed at a granularity dependent on the type of restrictions needed on their use and on the form of the data themselves, that is, the form in which the data have been provided. The distributor obtains (step S407) and examines each part or element of the data (at the desired granularity) and determines whether or not the element being processed (the current element being examined) is in the body of the data (step S408) (as opposed to being rules or ancillary information). If the current element being examined is determined to be in the body of the data, the distributor then decides whether or not the current data element is to be protected (step S410), that is, whether or not access to that element of the data is to be controlled and the data element is to be encrypted.

If the current data element is not to be protected, it is stored (step S412) in the unencrypted body part 122 of the packaged data 108. Otherwise, if the current data element is to be protected, it is encrypted using the data-encrypting key $K_D$ (step S414) and then the encrypted current data element is stored in the encrypted body part 120 of the packaged data 108 (step S416), after which the next element is processed (starting at step S407).

For example, if the data 106 are a textual article, the abstract of the article might not be protected (encrypted) while the rest of the article would be.

If the current data element is determined not to be in the body of the data (step S408), the distributor then determines if the current data element is access rules provided by the data owner (step S418). If so, the rules are protected by encrypting them using the rule-encrypting key $K_R$ (step S420) and the encrypted rules are then stored in the encrypted rules part 124 of the packaged data 108 (step S422).

If the current data element (being processed) is not access rules, the distributor determines whether or not it is ancillary information (step S424). This information includes such things as the identification of the publisher and the like. If the current data element is determined to be ancillary information, the ancillary information is protected by encrypting it using the data-encrypting key $K_D$ (step S426) and then the encrypted ancillary information is stored in the encrypted ancillary information part 126 of the packaged data 108 (step S428).

If the data are rules or ancillary information to be encrypted, then, after appropriate processing, the next data element is processed (step S407).

If the current data element is not a body part, access rules or ancillary information, some form of error is assumed to have occurred and is processed (step S430). After the error has been processed, the mechanism can continue processing the next data element (step S407) or terminate, depending on the implementation.

The operation of the system 101 shown in FIG. 5 differs from system 100 of FIG. 1 in that the rules 116 are distributed to users 104 separately from the packaged data 108. This is achieved with an authoring mechanism 148 which takes as input data 106 and rules 116 and produces, separately, packaged data 150 and packaged rules 152. The packaged data 150 without the rules has the form shown in FIG. 6, which is essentially the same as the structure shown in FIG. 2, but without the encrypted rules 124.

Note that an hybrid system, wherein some rules are packaged with the data and other rules are packaged separately is foreseen, using a combination of the mechanisms shown in FIGS. 1 and 5. In such a system, an operator selects which mode of operation to employ.

Figure 7:
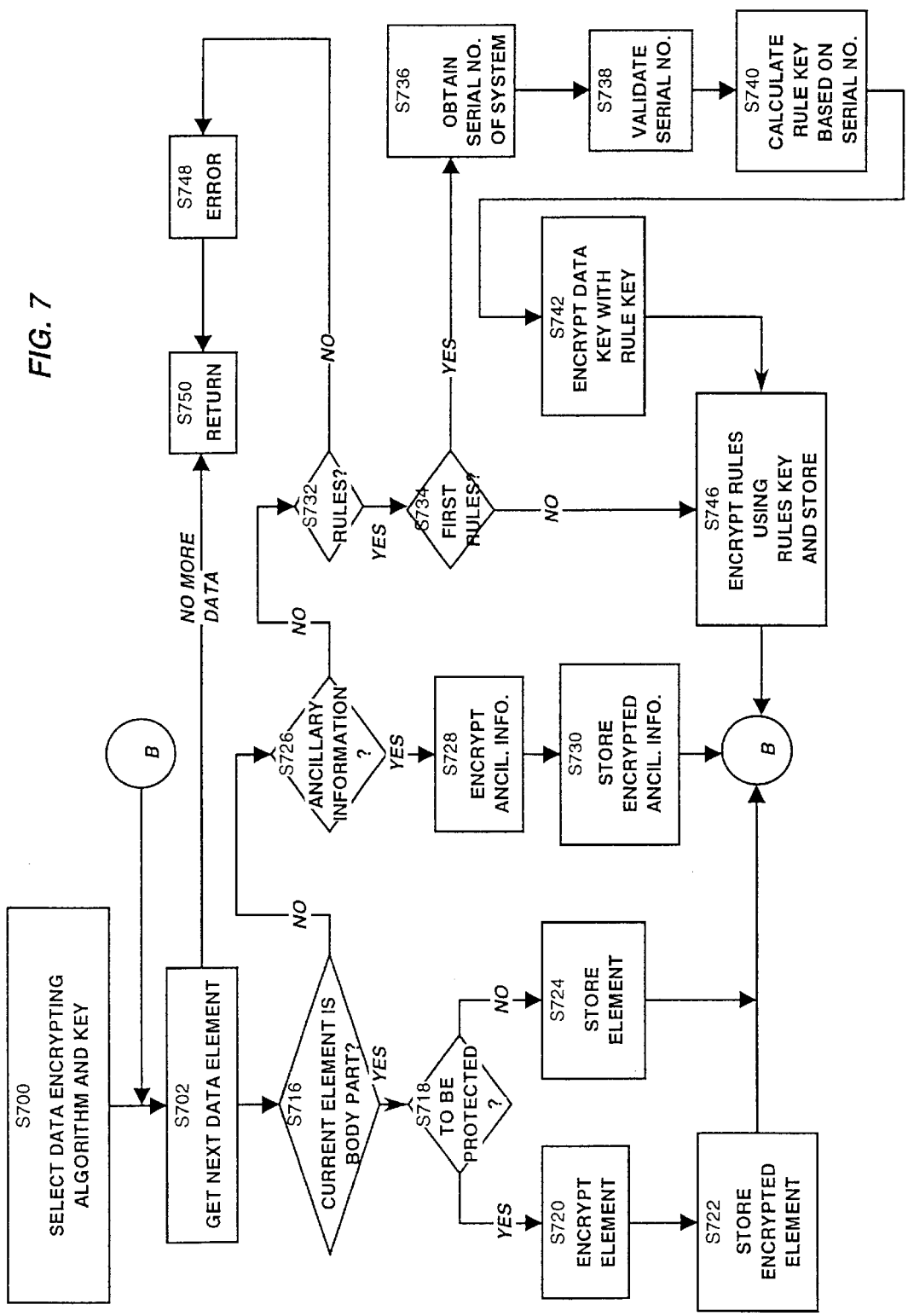
FIG. 7 is a flow chart of the authoring mechanism of the embodiment of the present invention depicted in FIG. 5.

FIG. 7 shows a flow chart of a version of the authoring mechanism 148 of the present invention in which the rules 116 are distributed by distributor 102 separately from the packaged data 150. Rules 116 and data 106 can be presented to the authoring mechanism 148 in any order, or in an interleaved fashion. In fact, the rules 116 need not all be provided together. The distributor 102 first selects a data-encrypting algorithm and a data encrypting key, $K_D$ (step S700). Then the authoring mechanism 148 processes the data element-by-element (starting at step S702). As in the case of the mechanism shown in FIG. 4, a data element is assumed to be one of either a body part, ancillary information or access rules.

First it is determined whether or not the current data element is a body part (step S716). If it is determined (in step S716) that the current data element is a body element, then it must be determined (in step S718) whether or not the data are to be protected. As in the case when the rules are distributed with the packaged data 108, the decision as to whether or not to protect a specific data element depends on the owner of the data and the distribution policies as implemented in the rules.

If the data are to be protected (step S718), the data in the current data element are encrypted using data-encrypting key $K_D$ (step S720) and then the encrypted data are stored in the packaged data 150 in the encrypted body part section 120 (step S722). On the other hand, if the data in the current data element are not to be protected, the data are stored in the unencrypted body part section 122 of the packaged data 150 (in step S724). In either case, after the data element is stored (steps S722 or S724), the next data element is processed (starting at step S702).

If the current data element is determined not to be a body element (step S716), then the mechanism checks to determine whether or not the current data element is ancillary information (step S726). If the current data element is determined to be ancillary information, it is protected by encrypting it using data-encrypting key $K_D$ (step S726) and then the encrypted current data element is stored in the packaged data 150 in the encrypted ancillary information section 126 (in step S730). Then the next data element is processed, starting at step S702.

If the current data element is neither a body element (step S716) nor ancillary information (step S726), then the it is determined whether or not the current data element is access rules (step S732). If so, the rules are to be distributed separately from the packaged data 150, and are processed accordingly as follows:

If this is the first time the access mechanism is processing rules for this data set then a rule-encrypting key $K_R$ must be determined. Accordingly, it is determined whether these are the first rules being processed for this data set (step S734). If so, obtain and validate the serial number, SN, of the system (steps S736 and S738). Then calculate the rule-encrypting key $K_R$ as a function of the validated serial number ($K_R$=f(SN), for some appropriate function f (step S740). Function f may, for example, be an inquiry to a certification database or certification authority to obtain the public key so as to ensure that the serial number is authentic. Having determined the rule-encrypting key (step S740), encrypt the data key $K_D$ with the calculated rule-encrypting key $K_R$ (step S742) and store the keys (step S744). Next, encrypt the rules using the rule-encrypting key $K_R$ (step S746). The encrypted rules and the encrypted data key $K_D$ are stored as packaged rules 152 for subsequent distribution. The rule-encrypting key $K_R$ may be stored or recalculated from the serial number whenever needed.

If it is determined (in step S734) that the this is not the first rules being processed for this data set, then the rule-encrypting key $K_R$ has already been calculated (step S740) and stored (step S744). In that case, the rules in the current data element are encrypted using the rule-encrypting key $K_R$ (step S742).

Once the rules in the current data element are processed, processing continues with the next data element (step S702).

If the authoring mechanism 148 determines that the current data element is not a body part (step S716), ancillary information (step S726) or rules (step S732), then some form of error has occurred and is processed (step S748). After an error has occurred, the mechanism 148 can either cease processing (step S750) or, in some embodiments, continue processing further data elements (step S702).

The data 106 provided to the distributor 102 and the packaged data 108 (or 150 and packaged rules 152, if provided separately) provided to the user 104, may be provided and distributed in various ways, including but not limited to, via digital communications networks (for example, the Internet or the projected National Information Infrastructure (NII)), magnetic media (for example, tape or disk), CD-ROM, semiconductor memory modules (for example, flash memory, PCMCIA RAM cards), and wireless (for example, broadcast). The packaged data 108 may be provided to a user as a single packaged entity or as a continuous stream of data. For example, a user may obtain a CD-ROM having a movie stored as packaged data thereon or the user may obtain the movie as a continuous stream of broadcast data for one-time viewing.

Information (such as the packaged data 108 from the distributor 102 to the user 104) can be transmitted openly, that is, using mechanisms and media that are subject to access and copying. In other words, communication channel 105 may be insecure.

The Access Mechanism

The access mechanism 114 allows a user 104 to access the data in packaged data 108 (or 150) according to the rules provided with (or separately from, as packaged rules 152) the packaged data and prevents the user or anyone else from accessing the data other than as allowed by the rules. However, having granted a user controlled access to data (according to the rules), it is necessary to prevent the user or others from gaining unauthorized access to the data. It is further necessary to prevent the data from being further distributed without authorization.

The access mechanism 114 used by the user 104 to access data is described with reference to FIG. 8 and includes a processing unit 154, read-only memory (ROM) 156, volatile memory (RAM) 158, I/O controller 165 and some form of energy source 166 such as, for example, a battery. Access mechanism 114 may also include electrically-alterable non-volatile memory 160, a hard disk 162, a display 164, and special purpose components such as encryption hardware 168.

The access mechanism 114 is also connected via insecure channels 174 and 176 and I/O controller 165 to various controlled display or output devices such as controlled printer 178 and controlled display monitor 180. (Interaction with these controlled devices is described in detail below.)

Various other devices or mechanisms can be connected to I/O controller 165, for example, display 155, printer 157, network connection device 159, floppy disk 161 and modem 163. These devices will only receive plaintext from the I/O controller 165, and then only such as is allowed by the rules. The network connection device 159 can receive either plaintext or encrypted text for further distribution.

All components of the access mechanism 114 are packaged in such a way as to exclude any unknown access by a user and to discover any such attempt at user access to the components or their contents. That is, the access mechanism 114 is packaged in a tamper-detectable manner, and, once tampering is detected, the. access mechanism is disabled.

Figure 8:
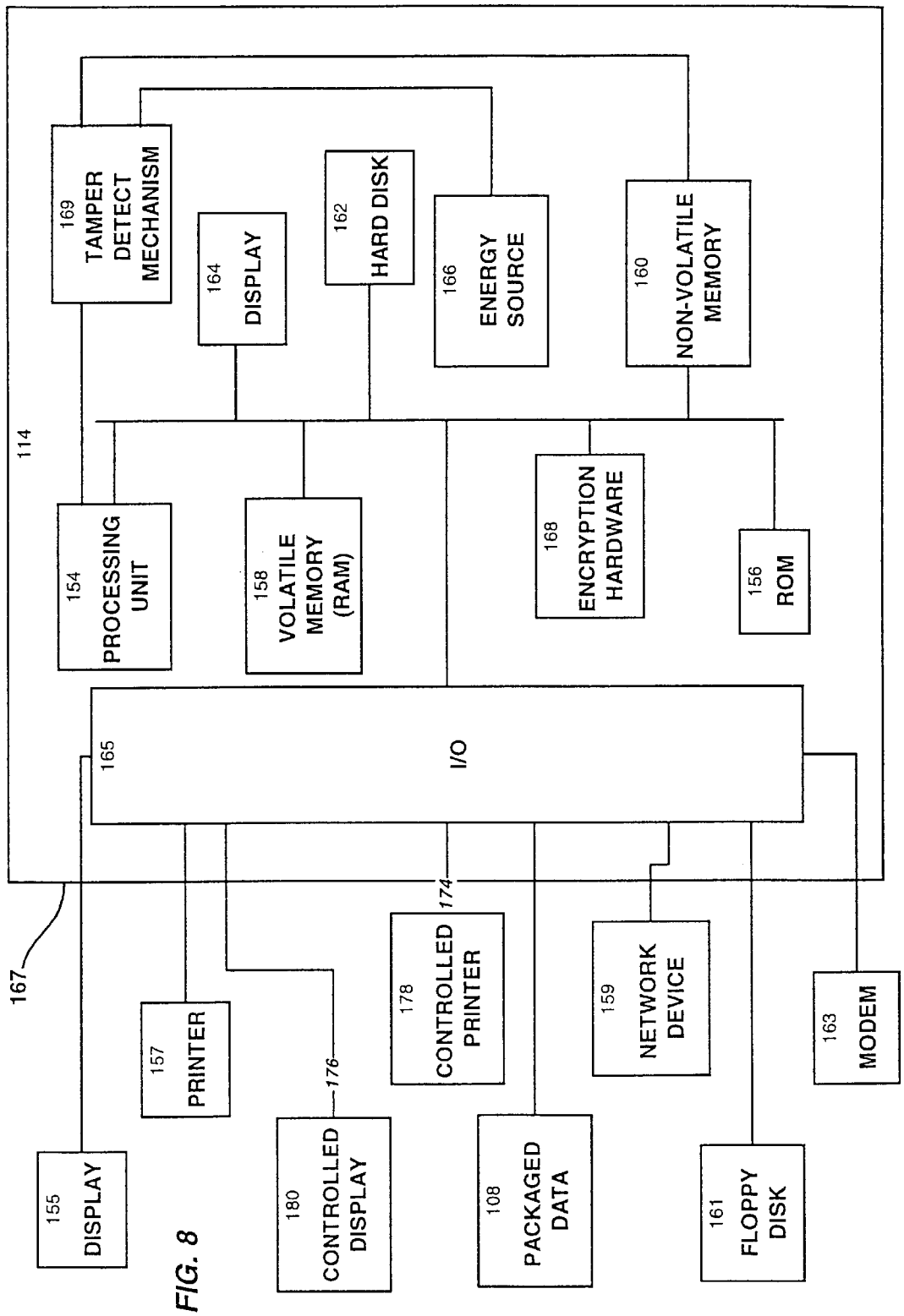

The line 167 depicted in FIG. 8 defines a so-called security boundary for the components of the access mechanism 114. Any components required for tamper detection (tamper detect mechanism 169) are also included as part of the access mechanism 114. Tamper detect mechanism 169 is connected in some appropriate manner to processing unit 154, energy source 166, and non-volatile memory 160.

This invention employs a combination of physical self-protection measures coupled with means for detecting that the self-protection has been circumvented or that an attempt to circumvent the self-protection measures is being or has been made. When such intrusion is detected, passive or active mechanisms can be employed to destroy data. For example, the following can occur (not necessarily in the order stated, and usually in parallel): the access mechanism 114 is made inoperative, all cryptographic keys within the mechanism, the private key and any other keys and data are destroyed (zeroized), and power may be applied to clear non-volatile memory 160 and then is removed, resulting in loss of all data stored in volatile memory 158 so as to deny access to decryption keys as well as to any cleartext in those memories. As noted above, several operations can be accommodated or performed simultaneously when tampering is detected. This can be done by hardware circuits. Based on risk assessment and the availability of particular technology, other implementations may be selected.

Tamper detection allows the access mechanism 114 to ensure that all internal data (both the system's data and any user data) are destroyed before any tamperer can obtain them.

One way to deny access to the data within access mechanism 114 is to package all of the components within a physical case which defines the area which is excluded from user access. As an example, a typical portable lap-top computer meets the requirement of having all components within the same physical package or case. Detection that the case has been opened is straightforward and well known.

As an alternative embodiment of the access mechanism 114, the components of the access mechanism 114 can be used as a co-processor of another processor or computer. In this case, as shown in FIG. 9, the access mechanism 114 communicates with the other computer 170 via a communications channel 172. The co-processor can be implemented as a circuit board and is designed to be plugged into the bus 172 on the main board (that is, the mother board or planar board) of the other computer 170. In that case, the computer 170 will operate normally unless it needs to access controlled data, at which time it will pass control to the access mechanism 114.

The degrees of protection used in the access mechanism (for example, tamper-detect features) and the cryptographic tools employed will depend on the nature of the data to be protected as well as the user environment.

Several techniques for physically secure coprocessor packaging are described by Yee (Yee, B., *Using Secure Coprocessors*, Carnegie Mellon University, School of Computer Science, CMU-CS-94-149, 1994 (also available Defense Technical Information Center as AD-A281 255)). In Yee, physical protection is described as a tamper-detecting enclosure. The only authorized way through the enclosure is through a coprocessor-controlled interface. Attempts to violate physical protection in order to gain access to the components of the coprocessor module will be detected and appropriate action taken. For example, detection of attack results in erasure of non-volatile memory before attackers can penetrate far enough to disable the sensors or read memory contents.

Any known form of tamper protection and detection can be used, as long as it functions to destroy the data as required.

Any data which are to be sent out of the security boundary 167 are under the control of the access mechanism 114. All I/O requests and interrupts are handled by the access mechanism 114.

All communication between the components of the access mechanism 114 and the enclosed hard disk 162 is encrypted. Therefore, if the hard disk is removed from the mechanism, any data stored thereon will be inaccessible without the appropriate keys. The encryption of the data stored on the hard disk can use cryptographic keys generated within the access mechanism and which are never known outside of the mechanism. In this way, when tampering is detected, the cryptographic keys will be lost.

In general, within the system, the data are encrypted on any non-volatile storage devices so that they remain unavailable in the case of tampering. Unencrypted data are only present within the access mechanism 114 inside the security boundary 167 in components where the data can be destroyed when tampering with the access mechanism 114 is detected.

With reference to FIGS. 8 and 9, the access mechanism 114 is also connected via insecure channels 174 and 176 and bus 177 to various controlled or uncontrolled display or output devices such as described above. This allows the system to communicate with uncontrolled devices (so-called standard devices) as well as networks, within the context of the rules/permission list. (Interaction with these controlled devices is described in detail below.) All communications on the insecure channels 174 and 176 and on bus 177 is encrypted by the access mechanism 114 (and by the authoring mechanism 112), and the controlled output devices 178 and 180 must have suitable processing capabilities within them (including an access mechanism 114) to decrypt and process data which they receive. The display or output devices used will depend on the application and the type of data, and include, but are not limited to, printers, video display monitors, audio output devices, and the like.

The embodiment shown in FIG. 9 can also include other standard devices (connected to bus 177) such as, for example, standard printer 181, floppy disk 185, modem 187 and the like.

The Accessing Operation

Figure 10A:
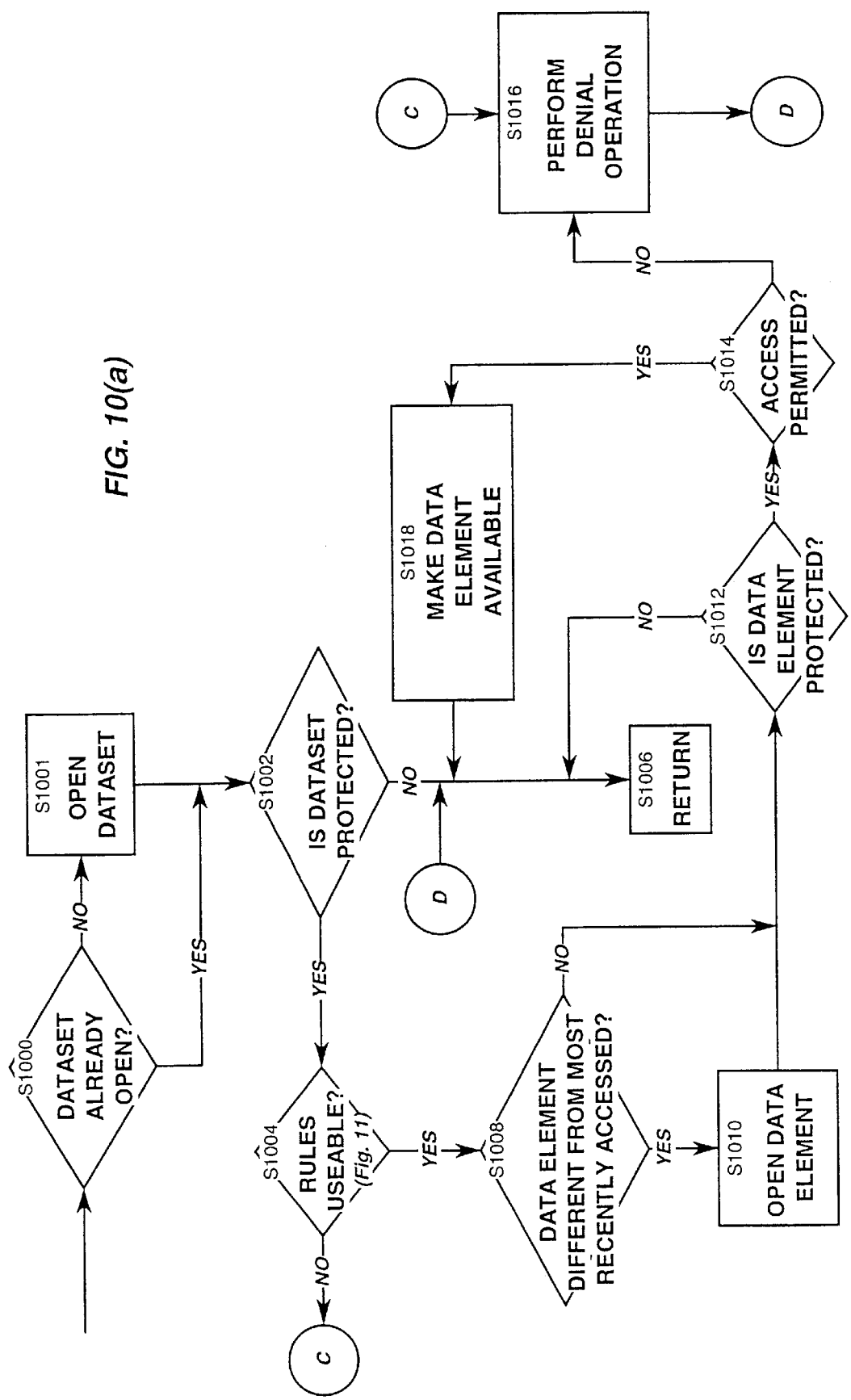

When a user 104 obtains packaged data 108 (or 150) from a distributor 102, the user can then access the data according to the rules provided therewith or provided separately. Data access is supported by the access mechanism 114 and is described with reference to FIGS. 8, 9 and 10(*a*), where FIG. 10(*a*) is a flow chart of the data access using the access mechanisms shown in FIGS. 8 and 9.

Note initially that, depending on the type of data to be accessed and viewed, as well as the rules, the viewing process may or may not be interactive. For example, if a user is accessing a textual document, the user may choose to access only selected portions of that document, the choice being made by viewing an index of the document. On the other hand, if a user is accessing a movie, the viewing may be continuous (if the rules do not allow a user to re-watch portions of the movie without additional payment). The access and viewing process is described here for an interactive case, since non-interactive access can be considered access with a single ("start-viewing") interaction.

Note further that initiation of the access mechanism activates monitoring for interrupts and polling by the access mechanism 114. A user may also implicitly invoke the access mechanism by accessing an object (data) protected by the system. This invocation also activates monitoring for interrupts and polling.

The following discussion assumes, without loss of generality, that the data are being accessed by an application via an insecure operating system (OS) which invokes the access mechanism 114. The intent is to show the manner in which controlled access of the data takes place. In some foreseen environments, the operating system will be little more than a simple run-time system or there will be only one program running at all times. For example, in a video cassette recorder and playback machine (VCR), a single control program may be running at all times to control the VCR's operations. In this case, this control program is considered the application, and all access to controlled data is initiated by the control program which invokes the access mechanism 114.

To initiate an input access to a data element, a user must request the operating system to read such data into memory from an I/O device. Initiating I/O gives control to the access mechanism 114.

For input access to an input data element, the access mechanism 114 first determines whether the dataset containing the data element is already open (step S1000). If the dataset is not already open, it is opened (step S1001). Once opened, it is determined whether or not the dataset is protected (step S1002). Note that the data being accessed may or may not be part of packaged data. In some embodiments the access mechanism 114 can maintain a record of which open datasets are protected.

If it is determined that the dataset is not protected (step S1002), then control returns to the invoking process (step S1006). On the other hand, if the dataset is protected (step S1002) then it is determined whether or not the rules for this dataset are useable (present, available and valid) (step S1004). (The process of determining whether the rules are useable, i.e., step S1004 is described below with reference to FIG. 11.)

If the rules are determined to be useable (step S1004) then it is determined whether the data element being accessed is different from the most recently accessed data element (step S1008). If so, the data element is opened (step S1010) (otherwise the data element is already opened and available).

Next it is determined whether or not the data element is protected (step S1012). If the data element is not protected then control returns to the invoking process (step S1006). Otherwise, it is determined whether or not access is permitted (according to the rules) (step S1014). If no access to the data element is permitted then an access denial operation is performed (step S1016). For example, depending on the rules, the access mechanism 114 could either return to the invoking process (e.g., the operating system) or abort or perform some other operation. Following the access denial operation (step S1016), control returns to the invoking process (step S1006).

If access to the data element is permitted (step S1014), then the data element is made available, consistent with the rules, (step S1018) and control returns to the invoking process (step S1006).

If, in step S1004, it is determined that the rules are not useable, then an access denial operation is performed (step S1016), following which control returns to the invoking process (step S1006).

In some embodiments and/or uses of the system, the system obtains and sets up for enforcement all of the rules in the encrypted rules 124 prior to any data access or selection. In other embodiments and/or uses, rules are set up or interrogated for enforcement as needed. Depending on the type of the data and the intended application, a minimal set of global rules (governing any or all access to the data) is typically set up prior to any data access. Accordingly, the enforcement of some of the rules is set up when the package is obtained, prior-to any user access.

In some embodiments some of the required rules may not actually be provided, but are indicated by reference. In those cases, the referenced rules must be obtained when needed before data processing can continue.

Once the appropriate rules, if any, are set up (stored within the access mechanism 114), and the access mechanism is ready to enforce them, then, according to the rules, the user can access an element of the data.

The operating system is notified of the termination (normal or otherwise) of each program so that it may close any files opened by the program. Because it is possible that multiple programs may be executing at the same time, the system will remain in a protected state (if any protected data has been accessed) until all active programs conclude their execution. At that time all protected data in addressable memory are destroyed, and all rules/permission lists of files that have been created are updated, all files are closed and system status flags are reset.

Whenever a user wishes to access protected data, the access mechanism 114 may determine that the rules are not yet available for determination of whether or not to allow that access. Three possibilities exist regarding the presence of the rules.

1. The rules are packaged with the data.
2. The rules are not packaged with the data but are already present in the access mechanism 114 (i.e., in memory). This situation occurs if, for example, the user loaded a disk containing the rules and then the access mechanism 114, upon receiving the interrupt announcing the disk's presence, read the first record, recognized it as rules and decrypted them, storing them for later use. (Reading a disk's contents in advance of any actual use is presently done, for example, by some virus checking programs.) If the implementor chose not to respond to interrupts when a device is loaded, then, when rules are required, the access mechanism 114 checks all "ready" devices and inputs those rules that are present. This covers the case where the rules are present on the hard disk.
3. The rules are not present. That is, the rules are not packaged with the data and do not reside on any device attached to the system. In this case, the access mechanism 114 notifies the user that the rules are required. The user responds by either:
   (a) indicating that the rules are not available (in which case the access mechanism 114 denies permission to the program); or
   (b) loading the rules (in which case the access mechanism 114 confirms their identity and continues). If the access mechanism is unable to confirm their identity, it can reissue a request for the rules.

With reference to FIG. 11, first the access mechanism 114 checks to determine whether or not the rules are already determined useable (step S1100). If so, the process returns a "success" indication to the invoking process (step S1102).

If the rules have not already been determined to be useable (step S1100), then the rules are located. First it is determined whether or not the rules are packaged with the data (step S1104). If so, the rules are made available (by decrypting them, if needed) (step S1106). If the rules are successfully made available (e.g., decryption succeeds) (step S1108), then the rules are checked for integrity (step S1110). If the rules pass an integrity check, then a "success" indication is returned to the invoking process (step S1112), otherwise a "fail" indication is returned (step S1127).

If the rules are not packaged with the data (step S1104), then the access mechanism 114, determines whether the rules are on a device attached to the access mechanism 114 (steps S1116–S1118). If the rules are not found on any device, then the user is asked to provide the rules (step S1114). At that time the user can abort the process (step S1120), in which case a "fail" indication is returned to the invoking process (step S1127). If the user chooses not to abort but to provide rules, those rules are read (step S1122) and, if they are a correct set of rules (step S1124), made available (step S1106). If the rules are not a correct set of rules (step S1124), then the user is informed (step S1126) and is prompted again for the rules (step S1114).

Regardless of whether or not the rules are provided with the packaged data, once the rules have been decrypted they are stored in the access mechanism 114.

Figure 12:
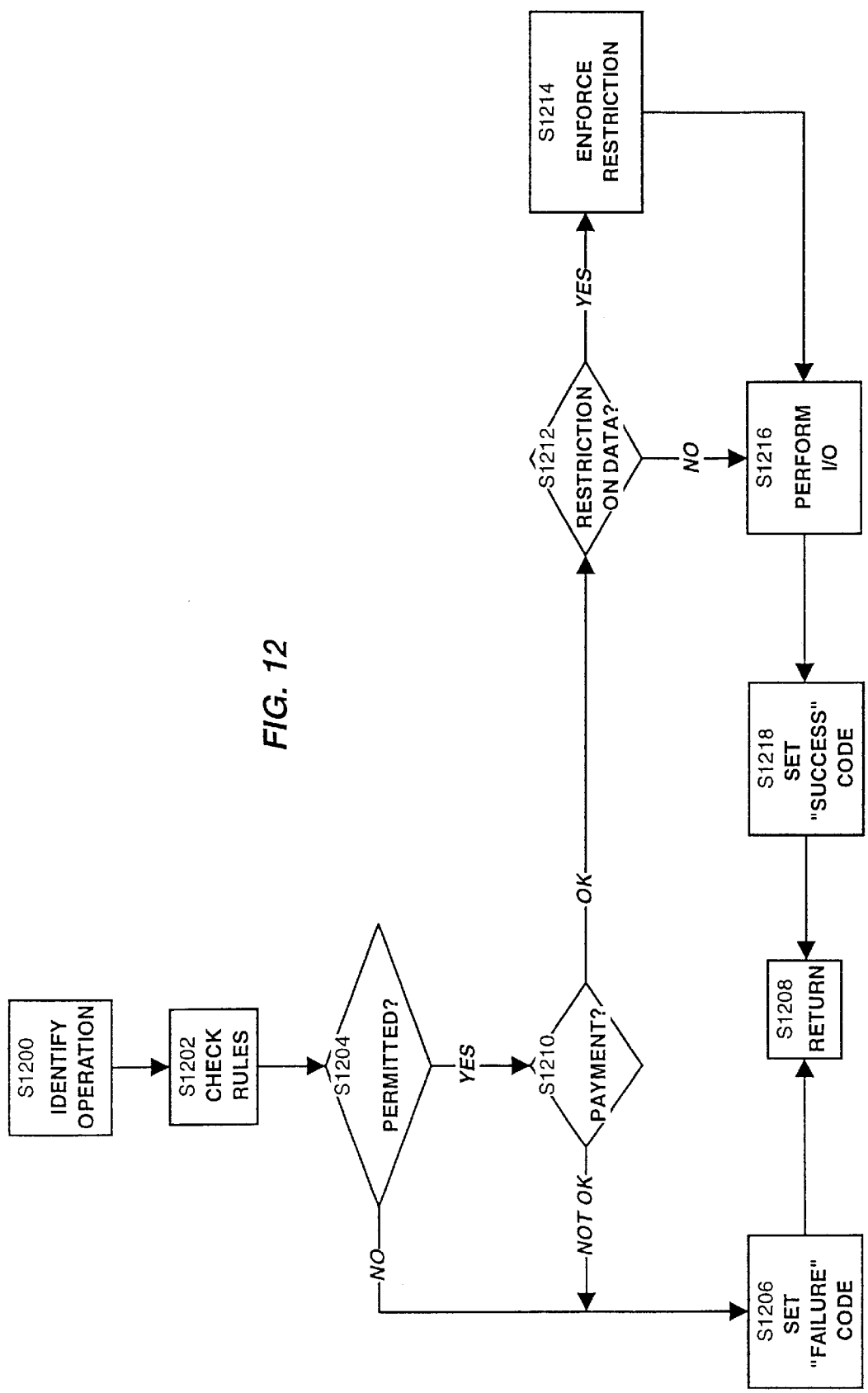

The process of executing an application to access the data according to the stored rules is described with reference to the flow chart shown in FIG. 12. For each data access operation to be performed by the application, first the operation is identified (step S1200) and the rules are checked (step S1202) to determine whether that operation is permitted (step S1204).

If it is determined (step S1204) that the operation is not permitted by the rules, a "failure" return-code is set (step S1206) and control is returned to the caller (operating system) (step S1208). On the other hand, if the operation is permitted (step S1204) then, if payment is determined to be acceptable (step S1210), then processing continues. (Payment is discussed further below.) If payment is determined to be unacceptable (step S1210), a "failure" return-code is set and control returns to the invoking application (steps S1206 and 1208).

If payment is determined to be acceptable (step S1210), then it is determined whether or not the rules apply any restrictions on the data (step S1212) (for example, whether or not the rules restrict the output format or amount of the data in some way). If it is determined that the rules restrict the data then the restriction is enforced (step S1214) and the I/O is performed based on the restriction (step S1216), otherwise the I/O is performed without restriction (step S1216).

After performing I/O (step S1216), a "successful" return code is set (step S1218), and control returns to the invoking application.

The Writing Operation

Figure 10B:
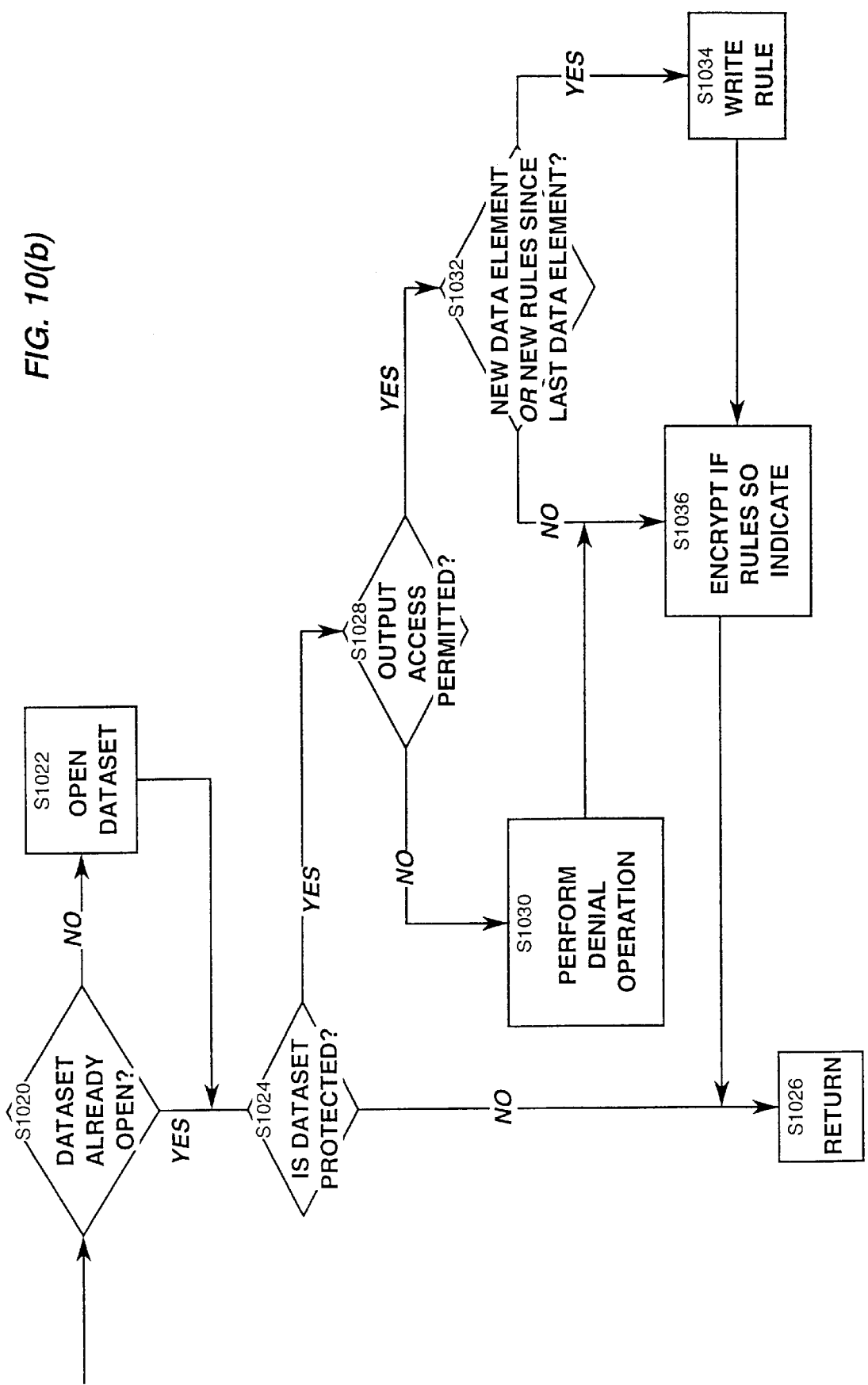

The process of writing data is described here with reference to FIG. 10(b). When an application attempts to write to a dataset, control is passed to the access mechanism 114 which opens the dataset for writing if it is not already open (steps S1020, S1022). Once opened, it is determined whether or not the dataset is to be protected (step S1024). The dataset (output file) would be protected if, for example, a protected dataset has been opened since the last time the access mechanism 114 cleared its memory or if the user indicated that output is to be protected (as when authoring a work).

Note that an output dataset may begin as unprotected and be written as unprotected (i.e., in the form it would have on a machine which does not have an access mechanism 114) and later additions to the dataset may require protection and therefore be written in the appropriate format. The transition between unprotected/protected data in a dataset are discussed below.

If the dataset is not to be protected (step S1024), control returns to the invoking process which writes the unprotected data (step S1026). On the other hand, if the dataset is to be protected (step S1024, then the rules are checked to determine whether or not output access is permitted (step S1028). If output access is not permitted, a denial operation is performed (step S1030). For example, depending on the rules, as part of this denial operation the access mechanism 114 could destroy the output data allowing randomized data to be written in their stead, could abort the function, or could abort the job. If access is permitted (step S1028), it is then determined whether a new data element is about to be written or whether new rules have been incorporated since the last write (step S1032). If either is the case, the rules are written (step S1034). After writing the rules (step S1034), or if neither was the case (step S1032), the data are encrypted if the rules so require (step S1036), and control returns to the invoking process (step S1026) where the (possibly encrypted) data are written.

Compatibility Issues

A protected dataset (packaged data) read by a system which does not employ an access mechanism 114 according to the present invention (or a dataset read by a system in non-protected mode) will be treated as data without any decryption taking place (by an access mechanism). In such a system, protected data elements will not be available to the user. This allows datasets (packaged data) freely to be copied and transmitted. Recipients will need to obtain any needed permission lists (rules) prior to being able to read the encrypted data in such datasets.

A non-protected (e.g., legacy) dataset (read using a system employing an access mechanism 114) that is treated as a protected dataset would require that rules be present before it would be accessed. The probability of such a mis-identification may be made vanishingly small, e.g., by computing a hash function of the data.

The user can be provided the opportunity to indicate that the dataset should be treated as unprotected. In order to do this, the access process described above with reference to FIGS. 10(a) and 11 allows a user to override the decision made in step S1002 as to whether or not the dataset is protected. Note that if a user incorrectly indicates that a protected dataset is unprotected, no access to the data would be available other than in encrypted (unusable) form.

Tamper Detection

Figure 13:
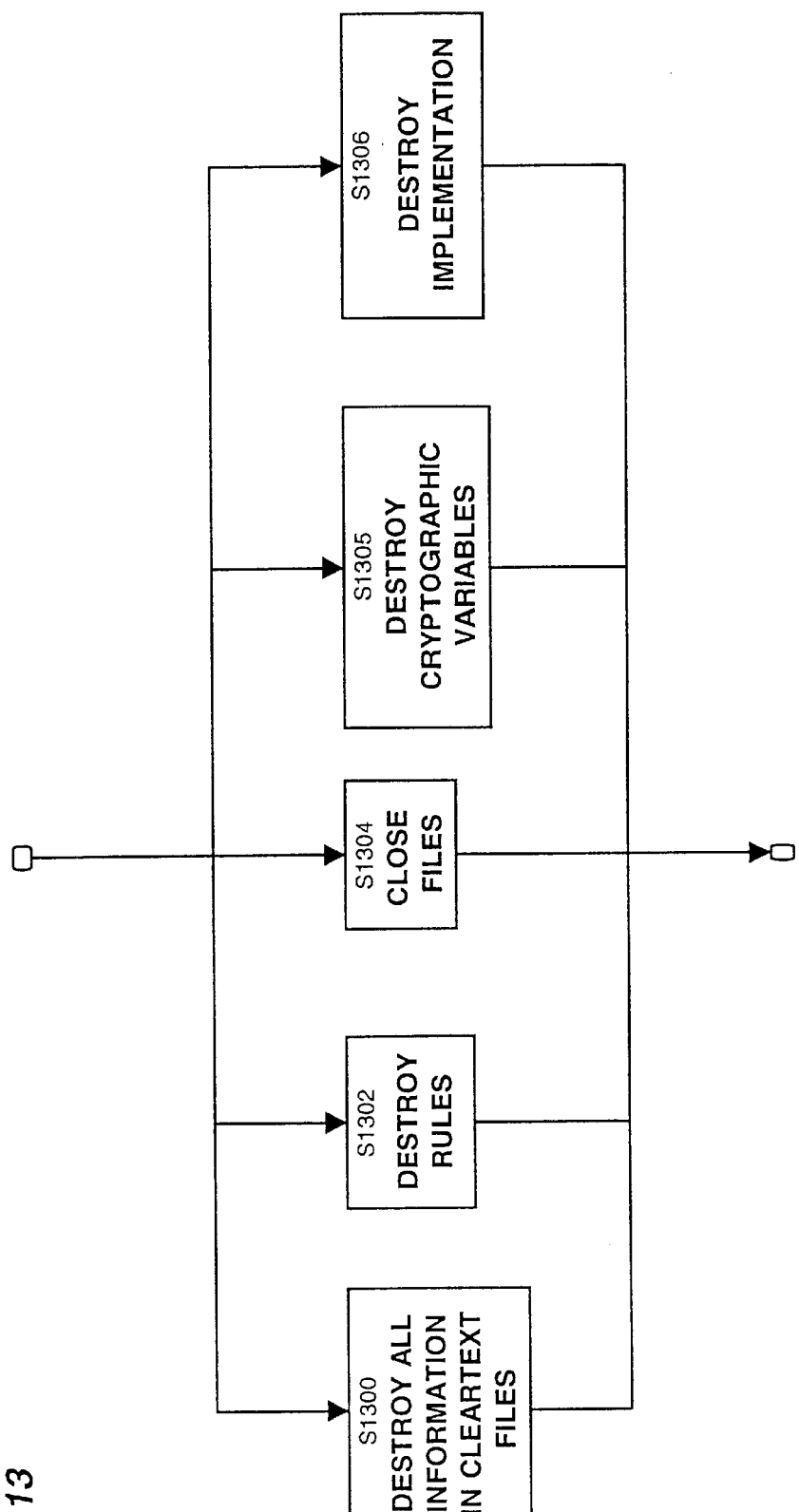

If and when tampering is detected, the access mechanism 114 performs at least the following operations illustrated in FIG. 13. The cryptographic variables (e.g., keys) are destroyed (step S1305), all rules are destroyed (step S1302), all cleartext (un-encrypted) information is destroyed (step S1300), all files are closed (step S1304), and the device is otherwise deactivated (step S1306). While these operations are described sequentially, in preferred embodiments they occur simultaneously or in some concurrent or parallel order, as shown in FIG. 13. If some order must be imposed on these operations, the first priority is to erase the cryptographic variables (step S1305).

Operational Considerations

Certain operational procedures may also be important to maintaining the protections and controls inherent in the present invention. Specific operational procedures may be employed to prevent equipment being built that would operate with an access mechanism according to the present invention and that also contained methods for circumventing the protections and controls in the access mechanism.

These operational procedures involve inspection, analysis, testing, and perhaps other procedures followed by certification of authorized access mechanism implementations. The inspection might include design analysis and physical chip inspection. Upon successful inspection, a cryptographically sealed certificate is stored within the protection perimeter. Note that this certificate is one of the data items that is destroyed upon detection of tampering. The certificate is issued by an authorized Certification Authority (CA) and includes therein a decryption key issued by that CA.

In some preferred embodiments, the rule-encrypting key $K_R$ is encrypted using the encryption key corresponding to the decryption key included in the certificate in each device. Then, in order to obtain $K_R$ within the device, the device must have the decryption key which was stored in the certificate by the CA.

Payment

In our market economy, producers and distributors of goods and services expect to be compensated. Intellectual property producers and distributors are no exception. The needs of commerce have been a primary factor in the evolution of information technology throughout history. Many of today's information infrastructure activities also deal with billing and payment.

Existing payment mechanisms either assume that the parties will at some time be in each other's physical presence or that there will be a sufficient delay in the payment process for frauds, overdrafts, and other undesirable conditions to be identified and corrected. Many of these payment mechanisms have already begun to adapt in response to the conduct of business over networks. Entirely new forms of electronic payment are evolving.

The following is a representative (but not definitive) list of electronic payment systems (some of the following names are trademarks): Anonymous Internet Mercantile Protocol; "BITBUX" from "MICROSOFT" and "VISA"; CARI (Collect All Relevant Information) the Internet Voice Robot, uses virtual credit cards to provide secure transactions from the Web; "CHECKFREE" plans for expanding the way commerce is conducted on the Internet; "COMMERCENET" secure commerce on the Internet based on Secure HTTP; "CYBERCASH"; "DIGICASH"; "DOWNTOWN ANYWHERE" has a system using account numbers, and personal payment passwords; First Bank of Internet (FBOI); First Virtual Internet Payment System allows real payment on the Internet; IkP, A Family of Secure Payment Protocols from IBM; Internet Banking White Paper from WebTech; NetBill Electronic Commerce Project; "NetCash"; "NetCheque"; "NetChex"; "NetMarket"; "Netscape Communications Netsite Commerce Server" and "Netscape Navigator"; "NexusBucks"; "Open Market"; Security First Network Bank is an Internet Savings Bank; SNPP: A Simple Network Payment Protocol; Sun Internet Commerce Group; Virtual Bank of the Internet.

Some electronic payment systems operate in real time by communicating through the Internet or direct dial. Others employ a prepaid balance which is debited against merchant credits, with periodic batch updating and transmission.

It is envisioned that embodiments of the present invention will employ an appropriate payment mechanism such as are well known in the art. Accordingly, the actual payment mechanism is not specified.

Rules and Policies

The rules (provided together with or separately from the packaged data) embody the data owner's control policies with respect to a user's access rights to the data.

The present invention permits the owner of intellectual property to realize a gain by selling or licensing various levels of access rights to the property and then ensuring that access beyond those rights is not obtained. The present invention ensures that only such qualities and quantities of access as released by the owner (generally, in exchange for payment) are allowed.

The rules are preferably embodied in a permission list. An example of permissions in such a list is shown in FIG. 3, and was described above.

While the rules allowed are open ended, an example set of rules (access control parameters) is given below. Access control parameters may be combined to provide varying sets of capabilities and to implement the enforcement of various policies. Some parameters are independent of any other parameters; some parameters are mutually exclusive; and other parameters must be used in combination to define fully the actions to be allowed or disallowed.

No Restriction

This would be the status if no restrictions were placed on the associated data. If this parameter is explicitly stated it overrides any contradictory parameter that may also be present. The data may be read, printed, executed, modified and copied.

No Modify

The associated data may not be edited or changed.

No Copy

The data may not be copied and a derivative work may not be made from the data.

No Execute

The data may not be executed.

No Print

The data may not be printed.

Print With Restriction of Type n

If the user prints after accessing the data, a simulated watermark will be printed as background or a header and/or footer will be placed on each page. The numeral n specifies the specific restriction to be applied, e.g., standard watermark (such as "do not copy"), personal (watermark such as "printed for name of user"), standard header/footer (such as "Company Name Confidential"), or personal header footer (such as "Printed for name of user").

No Access

Any user access, including an attempt to execute, will retrieve only encrypted data (ciphertext). This is the default case when there are no rules associated with data or the rules are corrupted.

No Child Access

Unless the user has been identified as an adult (for example by use of a password or a token) access will not be allowed for items identified as "adult material."

Access Cost=(Unit, Price)

Each time a unit of data (e.g., book, volume, chapter, page, paragraph, word, map, record, song, image, kilobyte, etc.) is opened, a cost of price is incurred.

Print Cost=(Unit, Price)

Each time a unit (e.g., page, file, image, etc.) is printed, a cost of price is incurred.

Copy/Transmit Cost=(Unit, Price)

Each time a unit (e.g., volume, file, record, page, kilobyte, image, etc.) is output, a cost of price is incurred.

Execute Only

The user may execute a program but may not read, print, modify or copy it. This rule protects against disclosure of an algorithm.

A permission list consists of rules governing the qualities and quantities of access made available by the owner to a particular user or group or class of users, and defines those ways in which the user may (and may not) interact with the owner's data/information. An encrypted permission list (for example, encrypted rules 124 in FIG. 2) is made available by the owner to the user, generally in exchange for fees (in the commercial domain) (for example, payment 110 in FIG. 1). The system denies the user direct access to manipulate the permission list, although in some cases it may allow the user to view the permission list. (The permission list may include rules governing access to the permission list itself). Use of a permission list may be limited to a particular computer system, a particular token (such as a smart card), a user-supplied password, or any combination of these or other items.

At the discretion of the intellectual property (data) owner, a permission list may also be valid for future releases of the data. This allows, for example, a software owner to plan for future releases that resolve problems discovered in an initial software release. In this example, the user of a particular version of a program, for instance, Version 6, might be allowed to use a subsequent version of the program, version 6.1, without further payment and without needing to obtain a new permission list or license. One who had not already licensed Program Version 6 would be required to purchase a new permission list/license in order to use Program Version 6.1.

A permission list may authorize and permit the user of intellectual property to create a derivative product for which the original owner may or may not have rights. In the case of a derivative product for which the owner of the original intellectual property has no rights, the owner of the derivative intellectual property can unilaterally issue a permission list governing use of that intellectual property.

Program execution occurs when a computer device follows a series of steps, or instructions, expressed in some symbology. The program may be linear, with one step always following its predecessor without variation, or the program may involve branching based on comparison of variables related to internal or external events and status. In the field of computer science a distinction is sometimes made according to the time at which the instructions comprising the program are translated into the computer's machine language in order to control the operation of the computer. Accordingly, terms such as assembly, compilation, and interpretation are used. This distinction is not important with respect to the present invention. The term execution is used herein to refer to all forms of program execution.

Controlling Primary Distribution

As noted above, digital information is transmitted openly. Accordingly, the data are typically distributed in an encrypted form.

Enforcing an Authorized User List

In some cases, it is useful to have a rule which controls access to data for certain specific users or classes of users. For example, data may only be accessible to people over the age of eighteen, or to people having a rank greater than or equal to that of captain, or to managers have a security clearance greater than top-secret. In these cases, each user can be provided with a separate set of rules for that specific user. In other words, each user can be provided with a unique set of rules. However, if the status of a user changes, then the rules for that user have to be changed. Accordingly, it is useful and convenient to have the rules be parameterized based on the status of the user and then have the user's status provided to the access mechanism 114 in a secure fashion.

The invention can be used in combination with software and other identification technology (for example, biometric sensors) to limit data access to users that possess an appropriate physical or logical token (for example, a dongle or password), or personal characteristic (for example, a fingerprint pattern). The secure hardware (via tamper detection) eliminates the potential for modifying and subverting the identification software.

Figure 14:
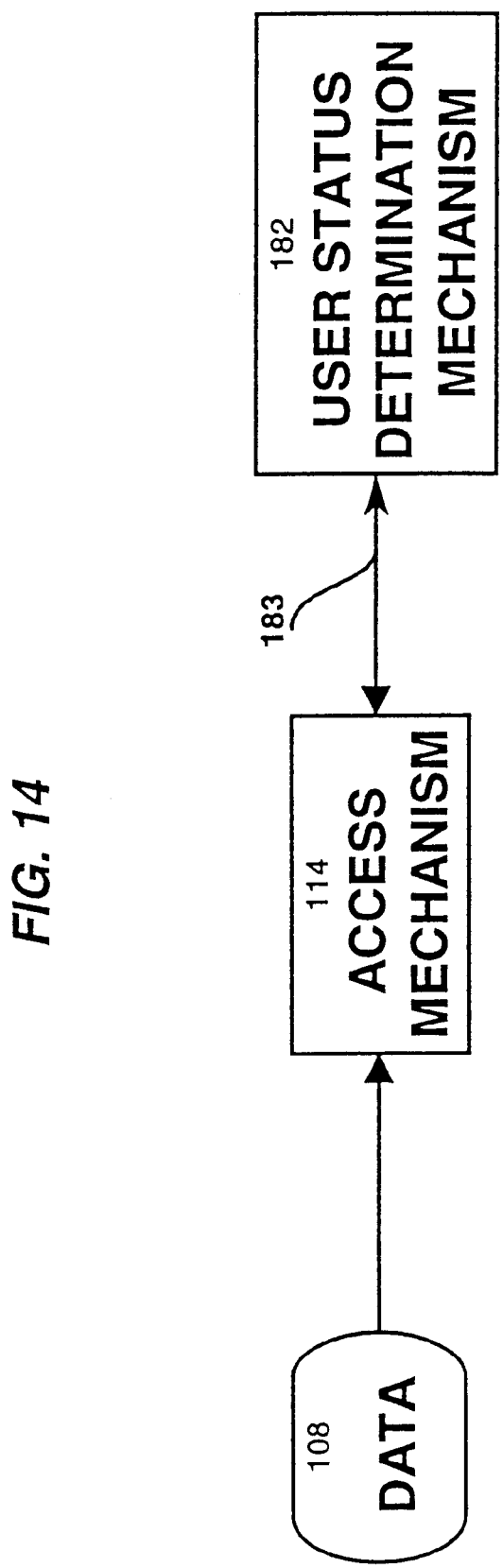
FIG. 14 shows an embodiment of the invention which uses an external user status determination mechanism.

An embodiment having such a configuration is shown in FIG. 14, wherein the access mechanism 114 is connected to an external secure device 182 in order to obtain the user's status. Channel 183, connecting the secure device 182 and the access mechanism 114 is preferably a secure channel (within the security boundary 167), however, if it is insecure, the device 182 must send information to the access mechanism 114 in a protected (e.g., encrypted) manner.

Controlling Access and Use

The invention can restrict the qualities or quantities of access to data in any manner that can be calculated or enumerated. A non-exhaustive, representative set of examples is given below.

Access Control Qualities (a) Local Display (for example, display of data on the computer's monitor).

(b) Printing (i.e., fixation in a form intelligible to a person).

(c) Copying (i.e., fixation on an electronic medium such as a disk or tape).

(d) Transmission (see below regarding controlling secondary distribution).

(e) Modification (i.e., changes to a copy of the primary distribution).

Access Control Quantities (a) Number of read-accesses (where "read access" refers to any kind of examination or retrieval of data/information).

(b) Size of read-access.

(c) Expiration date.

(d) Intensity of access (number/total volume of read-accesses in a unit of time).

(e) Resolution of access (for example, in the context of a map this would be the maximum scale allowed; for sensor data this would be the precision (number of bits) returned to the user).

(f) Delay (Accesses are permitted to data after a delay of n time units. This allows different user groups to view the same dataset with different results to queries. For example, a stock broker would be able to view the latest data, while a customer, paying less for the service, might receive data that are delayed by 15 minutes.)

Access Control Granularity

The above access control policies can be applied differently to different portions of the intellectual property. For example, a document's chapters might be controlled at different levels of quantity and quality; is a map's information might be controlled differently at different latitudes and longitudes; portions of an image may be restricted in availability, resolution, and the like.

Controlling Secondary Distribution

The invention provides absolute control of secondary distribution of data (for example, preventing or restricting potential use).

Transmission of (an unencrypted copy of) the primary distribution data (either to a network or to an output device such as a tape or disk) can only be effected when the system, acting under the rules embodied in the owner's permission list, allows external output. Denial of permission to transmit an unencrypted copy may result in no output or may result in transmission of an encrypted copy (for which the recipient must then negotiate permissions in order to use). Alternately, denial of permission to transmit may result in the transmission of random data, thereby denying the user knowledge of whether or not encrypted data was transferred.

Since all storage of data on internal non-volatile memory devices (for example, disks, flash memory, and the like) is encrypted, this ensures that a physical attack on the system will not result in compromise of plaintext.

Controlling Printing or Display

Printing or display of data is controlled in a manner similar to that used for controlling secondary distribution. One option is to disallow the ability to send particular information to a printer or display. If printing or display is allowed, the data stream to the output device is encrypted to ensure that an unauthorized user cannot intercept data sent to an external printer or display (that is, to a printer or display outside the tamper-detect protected enclosure). This necessitates that the receiving device contain a decryption subsystem. Thus, as shown in FIG. 8, data from access mechanism 114 via I/O controller 165 to either the controlled printer 178 or the controlled display 180 is encrypted on channels 174 and 176, respectively.

As discussed above when addressing the threat of capture of the output signal, an encryption mechanism is used for protecting data transfers to printer or display so that, if the data owner wishes, printing or display may be restricted to a specific printer or display device.

Instead of disallowing printing or display, these functions may be allowed with limitations as imposed by the owner. For example, output might contain a header/footer on each page indicating the identity of the authorized user; a watermark might be printed in the background; or other identifying material might be placed on each image. Of course, the data stream would be encrypted (as above) to prevent interception.

Document marking and identification techniques can be used to discourage the illicit copying of documents distributed in either paper or electronic form. The exact form of printer characters as well as line and word shifting have been used for document marking and identification ("Document Marking and Identification using both Line and Word Shifting," Low, S. H., et al. 1995 *INFOCOM Proceedings, IEEE*, pp. 853-, 1995).

One of the major technical and economic challenges faced by electronic publishing is that of preventing individuals from easily copying and illegally or without authorization distributing electronic documents. Cryptographic protocols used to discourage the distribution of illicit electronic copies are described in "Copyright Protection for Electronic Publishing over Computer Networks," Choudhury, A. K., et al., *IEEE Network*, pp. 12–20, May–June 1995.

Preferably, each controlled peripheral device (e.g., controlled printer 178 or display 180) is provided with an access mechanism which allows the device to process data it receives. This allows the data being sent to a controlled peripheral device from a system using an access mechanism to be treated as either a copy of data or a derivative work that is being sent to another user (that happens to be a peripheral). In other words, if a peripheral device contains an access mechanism, the data sent to the device can be packaged data. Using this approach, requires that the receiving access mechanism (the peripheral's access mechanism) may include the rules (permission list(s)) in order to obtain the key needed to decrypt the data in order to print or display them (or do whatever the peripheral does with data). If no permission list is included and the data are encrypted by the printer's public key, the printer's access mechanism decrypts the data and prints them (just as they would have been printed had the unencrypted data stream been received by a standard printer).

The access mechanism in the controlled peripheral device need not be a full system whenever the peripheral device is limited in function, for example, to only printing or displaying data. The peripheral and its access mechanism subsystem must be in a tamper-detecting enclosure.

As noted, it is envisioned that a computer or other device equipped with an access mechanism will be used with a controlled output device (printer or display) so equipped. If the data owner allows (via the rules) output (e.g., printing) to a controlled output device (e.g., printer) (equipped with an access mechanism), then there are two possibilities. The access mechanism in the user's computer can process any required payment and send the data, encrypted with the device's public key, to the printer or display for output. Alternately, the access mechanism processes the data as a derivative work (discussed below), packaging rules with the data, and the output device is responsible for separate payment (for example, allowing retention and multiple copies).

In order to limit the number of copies output, a short time window is included in the rules so that the recipient cannot capture (record) the file and replay it multiple times to the output device. Additionally, the access mechanism in the output device can contain a relatively small non-volatile memory that would hold the checksum of a file that is not to be output again for a certain time period, say, for 15 minutes from the first output (and an output permission list in the rules would specify "n copies, only valid for 15 minutes from x to x+15").

In the case of standard output devices (non-controlled, i.e., without access mechanisms), data are provided unencrypted (to the extent that the rules permit and payment has been provided).

Controlling Distributions of Derivative Works

In many application environments where intellectual property is created it is common to include extracts from other intellectual property. Such environments include writing scholarly papers, reviews, regulations, etc. The intellectual property containing the extract is a so-called derivative work. The intellectual property from which the extract was copied is called the parent work.

This invention controls the distribution of derivative works (that is, works created using information owned by another). Transmission of (an unencrypted copy of) a derivative work (to a network, to an output device such as a tape or disk, or to a printer or display device or the like) can only be effected when the system, acting under the rules embodied in permission lists created by each of the owners of any intellectual properties used in the derivative work, allows external output. Denial of permission to transmit an unencrypted copy may result in no output or may result in transmission of an encrypted copy (or, as noted above, may result in the transmission of random data). Use of an encrypted copy of a derivative work will, in general, require permissions from the owners of the derivative work as well as of the original works. The permission list associated with a work is incorporated into the permission list of any derivative work, either directly or by reference. License fees and restrictions imposed by the owner of a work are inherited by any derivative works. An n-th generation derivative work inherits the license fees and restrictions of each of its n−1 ancestors. If permission lists (rules) are incorporated by reference, the access mechanism ensures that the referenced permission lists (rules) are present (or it will deny access).

For example, if printing of an original work requires a watermark, then printing of any derivative work (if allowed at all) will require a watermark. This monotonicity/cascading of restrictions (i.e., each generation of a work must be at least as restricted as the prior generation) ensures that a derivative work that is only trivially changed from the original does not escape restrictions imposed on the original.

Creation of a derivative work for subsequent distribution requires an distributor 190 similar to distributor 102 shown in FIGS. 1 and 5. However, derivative work distributor 190 (shown in FIG. 15) includes an access mechanism 114 and can process, as input data, packaged data 108*a*. The output produced by distributor 190 is packaged data 108*b* which includes any rules (or references to rules) required by data which is derived from the input packaged data 108*a*. The access mechanism 114 within distributor 190 incorporates a global rule which enforces the distribution of rules with derivative works.

As noted earlier, the difference between the embodiments of the distributors 102 and 190, shown in FIGS. 1 and 15, respectively, is that the distributor 102 shown in FIG. 1 does not include an access mechanism 114. Accordingly, the distributor 102 deals only with newly created data (that is, with non-derivative data). The embodiment shown in FIG. 15 includes that of FIG. 1, and can also deal with input of protected data (previously packaged by a distributor). The embodiment of the system shown in FIG. 1 can be implemented purely in software, whereas the embodiment shown in FIG. 15 requires some hardware implementation.

It is envisioned that a standard computer, equipped with an access mechanism 114 will function as an authoring/distribution system. This allows all computer users to become authors and to incorporate previously published material into derivative works.

The rules associated with the parent work determine whether creation of derivative intellectual property is permitted, as well as the inheritance rules for incorporating the rules of the parent into the derivative work. Note that the rules derived from the parent apply only to the extract and that these rules applying to the extract need not be identical to the rules of the parent. The rules applying to the extract are specified by the owner of the parent, not by the creator of the derivative work.

For example, the rules applying to the extract might require payment to the owner of the parent for use of the derivative work containing the extract. If the creator of the derivative also required payment, the user of the derivative would make payments to two owners for use of the derivative. In an automated system the details of such multiple payments would be invisible to a user.

This invention enables such payment arrangements that would otherwise be prohibitively difficult and complex.

Another example relates to integrity and moral rights of the owner of the parent. The owner might wish to ensure that an extract was made without alteration or deletion, or that certain related information were included (for example, to prevent the extract from being taken out of context).

Data extracted from the parent comes with rules already attached or associated. These rules propagate into the derivative, but are applicable only to the extract. Extracts from the same parent may or may not share rules. Extracts from multiple parents may result in multiple rules applying to different extracts. As noted, a derivative work may contain references to data and rules rather than the actual data and rules. For certain commercial products it may be desirable to have the final packaged data 108*b* be fully self-contained. Accordingly, the packaged data 108*b* output from this distributor 190 may require further processing in order to optimize it for commercial distribution. Such optimization might include, for example, obtaining and including copies of all rules and data referenced in the package.

Extract Authentication

Digital signatures authenticate digital information by providing proof that information received is precisely that which was sent, with no changes. This system provides a similar capability to authenticate extracts (quotes) of information.

Application environments, such as providing a legal trail of evidence or authenticating that a quotation is accurate, are enhanced by the ability to prove that the information has not been subject to unauthorized alteration.

Authenticated extraction is implemented by creating an extraction editor, that runs in the access mechanism 114. This extraction editor, possibly under human direction, can extract selected text but is unable to change the extract. When extraction is complete, the access mechanism 114 digitally signs the extract with a digital signature. This digital signature includes identification of the specific computer in which the access mechanism 114 is executing as well as identification of the specific extraction editor used.

The extraction editor can, optionally, be permitted or required to insert ellipsis to indicate deletions, and certain specified insertions, such as, for example, "[sic]," might be allowed.

In another embodiment, a so-called hyperlink can be used in newly created data to indicate the insertion location of a quotation. When an output operation is performed, the access mechanism 114 creates a separate quotation, with its own checksum and digital signature. Any recipient of data containing the hyperlink can verify that the contents of the hyperlink were captured by access mechanism 114 and delivered unchanged.

Controlling Use of Executable Software

Control of Primary Distributions

The invention enables the creator of executable software to restrict the use of the software to only those who have acquired permissions for various of its capabilities. Executable software will be distributed in encrypted form, externally treated as data, as described above. In general, execution of a program can be controlled for multiple purposes in a number of ways. Purchase of a license to execute software can be evidenced by a cryptographically protected certificate which is decrypted internally by the access mechanism 114. The executable software can check for the presence of the certificate, or for permission keys or other information contained in the certificate, once or many times during execution. Since the algorithm embodied in an executable program may be valuable intellectual property, the access mechanism 114 can prevent a licensee from reading, copying, or modifying unencrypted executable code. In order to prevent disclosure of the unencrypted executable code, it is kept wholly within the security perimeter of the access mechanism 114 for execution.

Elimination of the Distributor (Middleman)

The invention enables the executable software owner to make copies easily available on a network server in encrypted form. Users may download the executable software and then separately purchase the rights to utilize the executable software. Thus, a standard purchase of software may be accomplished electronically, dealing with the owner's electronic commerce system. Thereby, the entire process of acquiring the executable software package and then purchasing the rights to use it may be effected without going through a distributor.

Offering discounted upgrades to software licensees is also simplified. When a licensee claims eligibility for a discounted upgrade the executable software owner can check the record of purchase of rights for the prior version of the product. Once again, the entire process can be automated.

Simplification of Configuration Management

The executable software owner can elect to make available on a network server product improvements that operate with existing permission lists, thus immediately releasing product improvements and fixes.

Multiple levels of product capability can be incorporated into a single release and can be selectively enabled by different permission lists. The tailoring of different distributions, with differing capabilities is no longer necessary.

Active Control of Capability of Executable Software

The invention's control of distribution of data or information (that are not executable software) may be characterized as passive or transparent in that no changes are required in the data or information for them to be protected. The permission list that controls their use may be separately created, packaged, and supplied.

Figure 16:
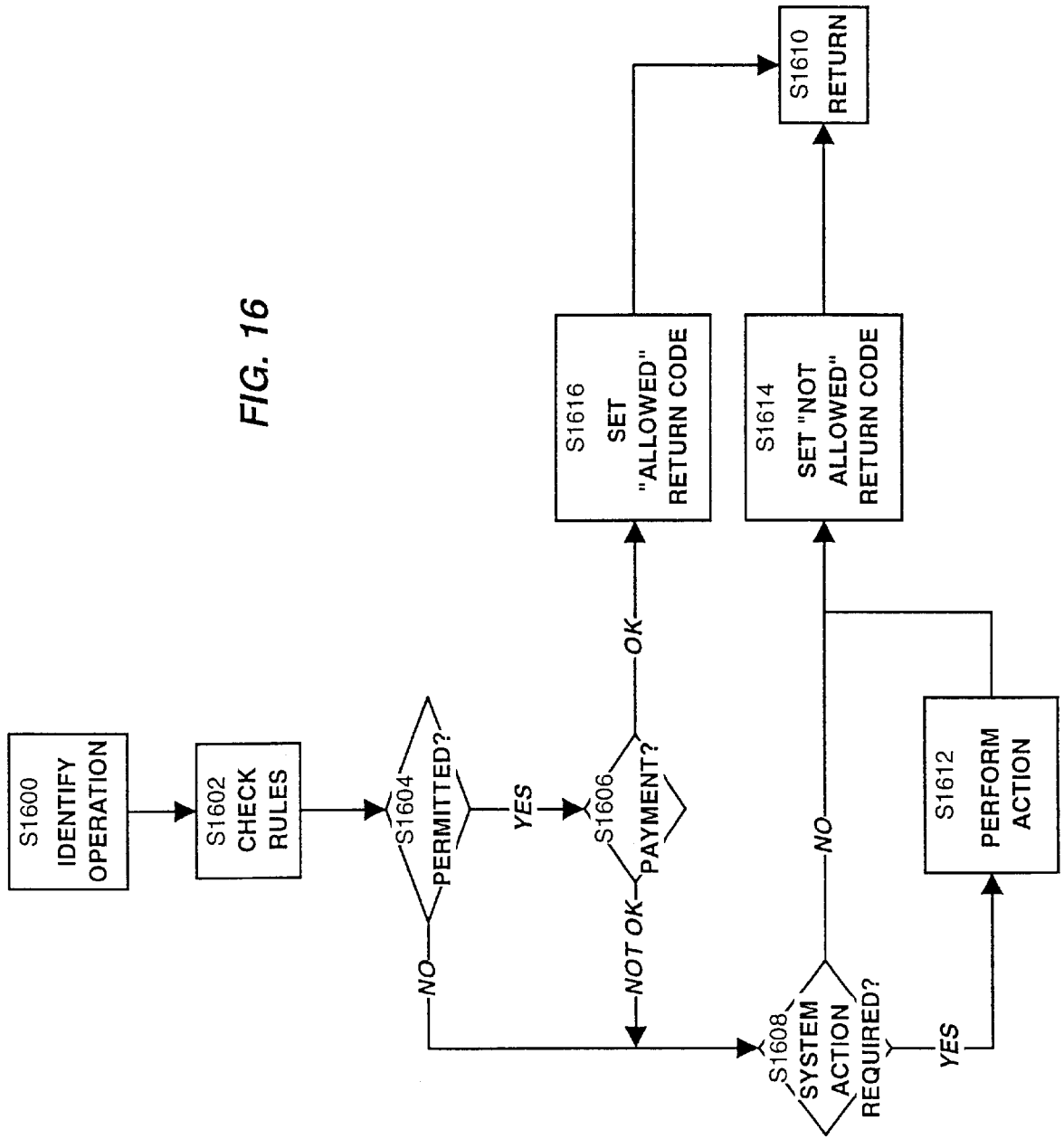
FIG. 16 is a flow chart of data access using the access mechanism shown in FIG. 15.

The control of primary distribution of data or information as well as the secondary distribution or distribution of modifications (derivatives) of data or information is passive. However, the invention's control of executable software capability is active and requires that the executable software developer use the programming interface provided by the system. At each point where the developer requires authorization, the executable software requests-a permission-check. As a result, the process of FIG. 16 is performed. If the requisite authorization is received, the function of the software is performed. If authorization is denied, an alternative action is chosen. The system may itself take certain actions including, for example, terminating a program or erasing data, when authorization is denied. As executable software is distributed in encrypted form, it can only be decrypted and executed (used) on a machine employing the access mechanism of the present invention.

With reference to FIG. 16, first the operation is identified (step S1600) and the rules are checked (step S1602). Next it is determined whether the rules permit the operation (step S1604). If the operation is not permitted (or it is permitted but payment is not acceptable (step S1606)), then it is determined whether any system action is required (step S1608). If no system action is required, the return code for "not allowed" is set and control is returned (step S1610), otherwise the system action is performed (step S1612) after which the return code for "not allowed" is set and control is returned (step S1610).

If the operation is permitted (step S1604) and payment is acceptable (step S1606), then the return code for "allowed" is set (step S1616).

The invention can be used to restrict the qualities or quantities of executable software execution in any manner that can be calculated or enumerated. Representative non-exhaustive examples of restrictions are given below. These restrictions may combined in any fashion.

Levels of Capability

Access to Specific Parts of Code or Features

Control of sizes or quantities that can be handled. For example, files may be allowed up to a specific size; complexity or accuracy of a solution may be limited, number of parameters or data points may be restricted, etc.

Quantitative Modifiers of Levels of Capability

Control of expiration dates, time of use, number and frequency of uses and permitted users. For example, rights to use of a file of data (whatever it contains) may expire on a certain date; access to certain data may be limited to certain times of day, days of the week or specific dates; a user may only be allowed to access certain data a specified number of times (or a specified number of times per day); or access to some data may be restricted based on the identity of the user.

Control of Secondary and Derivative Executable Software Distributions

This is handled in the same fashion as are data files, as described above.

Control of Executable Software as a Module of Other Executable Software

When protected executable software is incorporated into or used by other executable software on the system for which it was licensed, any limitations on its execution are maintained in the new context.

Restricting Use to Certified Software

The access mechanism 114 can be factory configured to restrict operation only to such software as is certified (e.g., by using a digital signature to ensure that the software was received unaltered from a certified source). Other contemplated applications include key escrow (also called "data recovery") systems (described below), systems for counting election ballots, systems for exchanging cryptographic data or algorithms, and systems for safeguarding financial, medical, or other personal data. Further, a system employing an access mechanism may be used to ensure that such software is not modified after being received or accessed for execution.

Process Control

Computer control of processes is the basis for automation and quality control in many industries. This technology extends into various specialties such as computer-aided manufacturing, control systems engineering, concurrent engineering, expert systems, intelligent sensors, just-in-time manufacturing, programmable logic controllers, robotics, robotic programming languages, and visualization techniques in engineering.

Formula, processes, procedures, and techniques may convey product differentiation, aesthetic and functional innovation, and increased cost-effectiveness. The computer programs and data involved in process control may constitute valuable intellectual property. The mechanisms of the present invention permit such data to be stored in process-control computers, transmitted to suppliers and subcontractors and otherwise employed without unauthorized disclosure, substitution, or modification.

The permissions associated with process control data may, for example, allow execution only—reading or observing the data would be prohibited. Execution may be restricted to specific equipment and to specific times. In general, the process controller is external to the equipment implementing the process. Hence, communication between the process controller and the process equipment must be cryptographically protected. Like the access mechanism in a controlled computer peripheral discussed herein, the access function in the process equipment need not be a full system whenever the peripheral device is limited and can not output data.

Key Escrow (Data Recovery) Systems

This system allows a provider of key escrow cryptographic executable software to require, by using a rule, certification that a key has been installed and deposited with a specified certification authority in order for the executable software to function. The access mechanism ensures the integrity of executable software that uses cryptographic executable software (whether or not key escrow), guarding against change or replacement.

Control of Classified Data

The invention can be used to support limitations on the (primary and secondary) distribution of data, access to data, and distribution of derivative data where the data are classified. Similarly, the execution of classified programs, or programs operating on classified data may be controlled by the system.

Ensured Issuance of Receipts

This system can be used to ensure that a receipt is issued under a number of circumstances, as demonstrated by representative examples given below. A software program (or electronic mail message) may request that a receipt be issued whenever it is loaded or executed (or when a mail message is received); a receipt may be issued when a mail message is read for the first time; or a program will not be loaded or executed (or mail opened for reading) unless the user first agrees to allow a receipt to be issued.

Ensuring Privacy

This system can be used to ensure privacy of sensitive records in a database. Examples include financial, census, medical, and political databases and the like. The system can allow inquiries that provide statistical summaries but do not reveal information about individuals. The rules would be used to limit the queries that might be posed.

Owner Control/Privileges

At the time of purchase the identity of the owner may be stored within the access mechanism. The access mechanism may allow the owner to place a global set of rules (a global permission list) in the mechanism. These global rules could control, for example, hours of access (e.g., when the computer might be operated) based on a clock within the access mechanism or an external time reference with which the access mechanism communicates; acceptable software which can be run using the access mechanism (i.e., a list of those software products that would be allowed to be used, thus enforcing a system administrator's configuration control rules); user and password lists, and the like. A user can thereby customize a particular access mechanism.

The rules may also include or specify certain programs to be run under certain conditions. For example, if the rules specify that all printed output must contain a watermark, the rules might also provide the watermark generating program. In these cases, the programs are either pre-loaded into the access mechanism 114, or are loaded when needed. These programs will then be executed when the corresponding rules or functions are invoked. For example, various types of watermark programs can reside in the access mechanism 114, and, depending on the rules, the appropriate one of these can be selected and executed.

Figure 6:
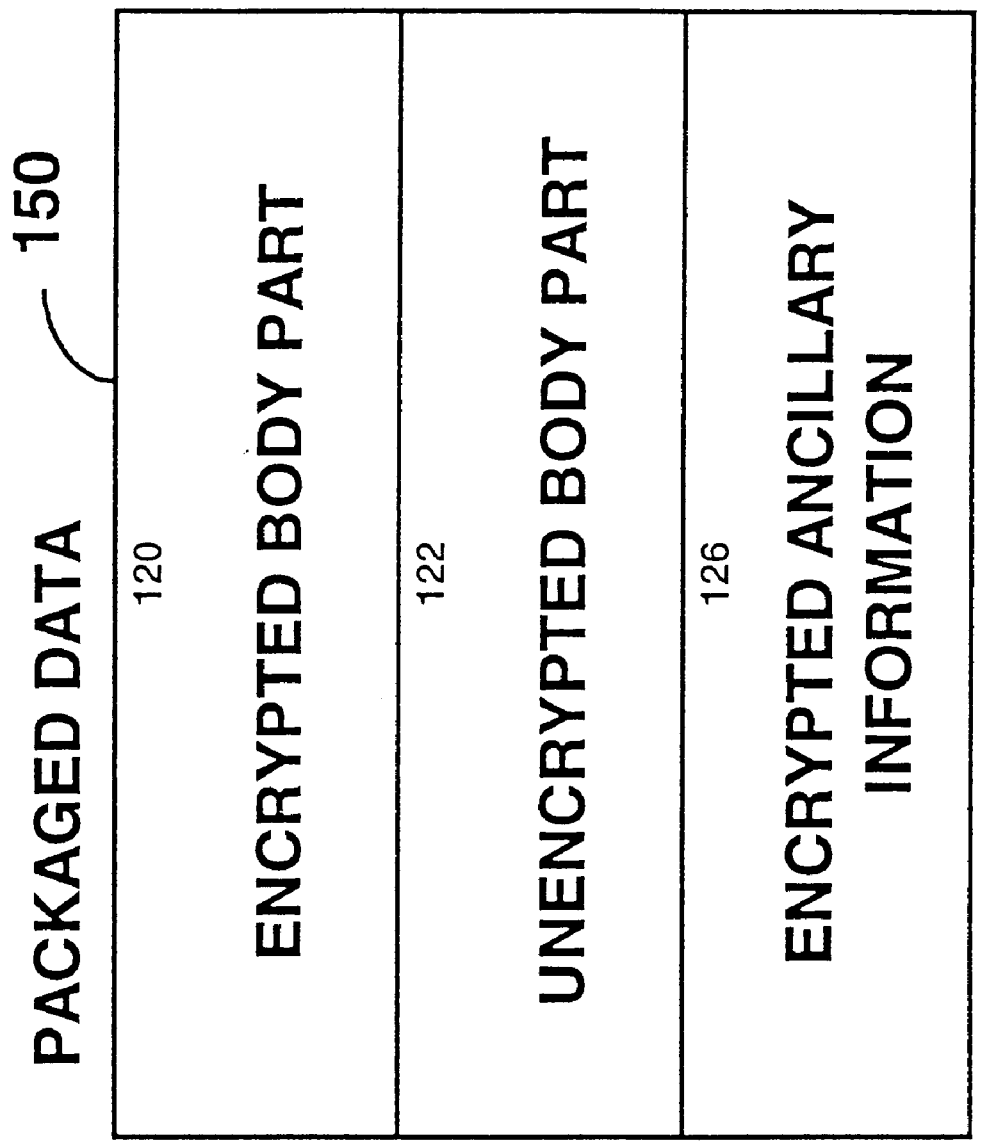
FIG. 6 is a logical data structure used by the embodiment depicted in FIG. 5.

Note that the data structures in FIGS. 2 and 6 depict logical organizations of the data. However, the actual physical format of the data depends on the type of the data as well as on the manner in which the data are to be used. Further, as noted above, the data package may be distributed in many ways, including networks, magnetic media, CD-ROM, semiconductor memory modules, and wireless broadcast and the like. In certain types of data distribution, e.g., continuous cable or wireless broadcast, a user may wish to begin accessing the data at an arbitrary point during its distribution. For example, if the data represent a broadcast movie which begins at 8 p.m., a particular user may only begin viewing at 8:30 p.m. In this case the user will have to initiate reception of the distribution while it is in progress.

Figure 17A:
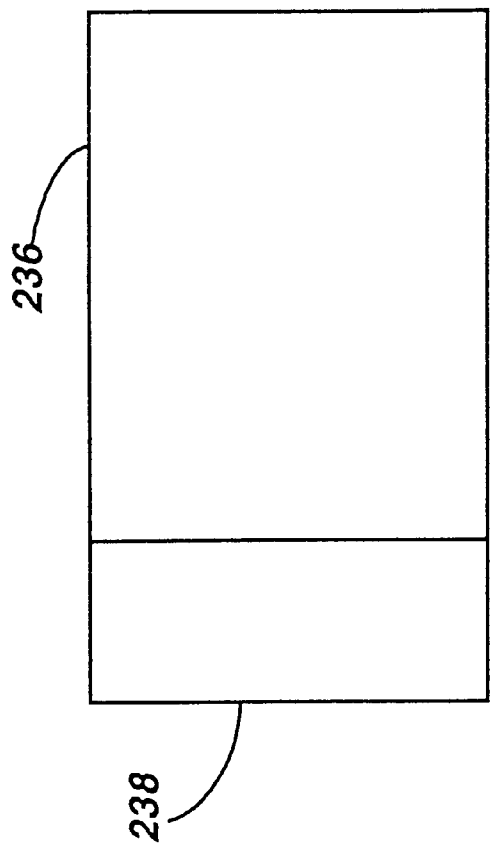
FIGS. 17(a) and 17(b) show packetized data according to the logical data structures shown in FIGS. 2 and 6.
Figure 17B:
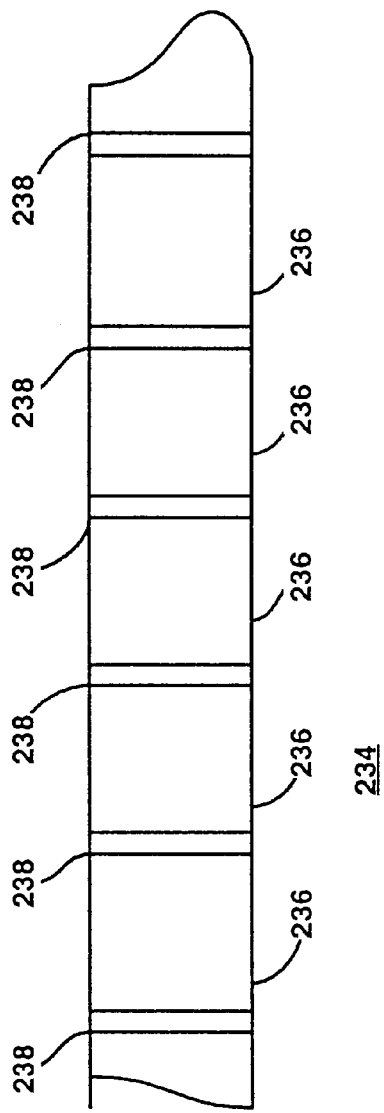

Accordingly, as shown in FIG. 17(a), in some embodiments, the packaged data are distributed in discrete packets 236 of data. The packets 236 include information 238 which enables a user to synchronize with the data distribution and further enables the user to begin accessing the data according to the rules. An example of such a packetized stream of data is shown in FIG. 17(b) wherein the stream 234 consists of discrete packets 236 of data, each packet containing synchronization data 238.

EXAMPLES

The following examples indicate some envisioned data and its packaging and rules. These examples are only intended to show some of the envisioned uses of the present invention, and are in no way intended to limit its uses.

Books

Figure 18B:
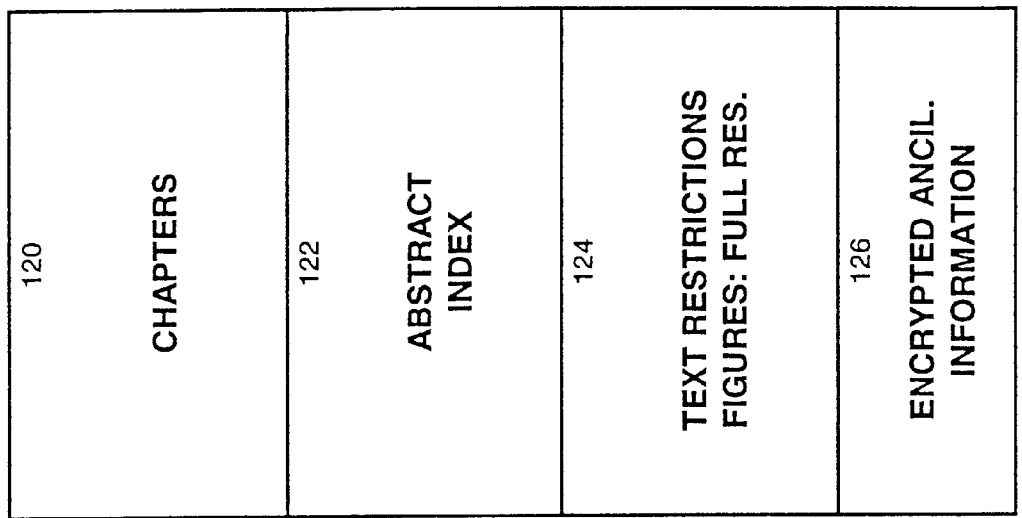
Figure 18A:
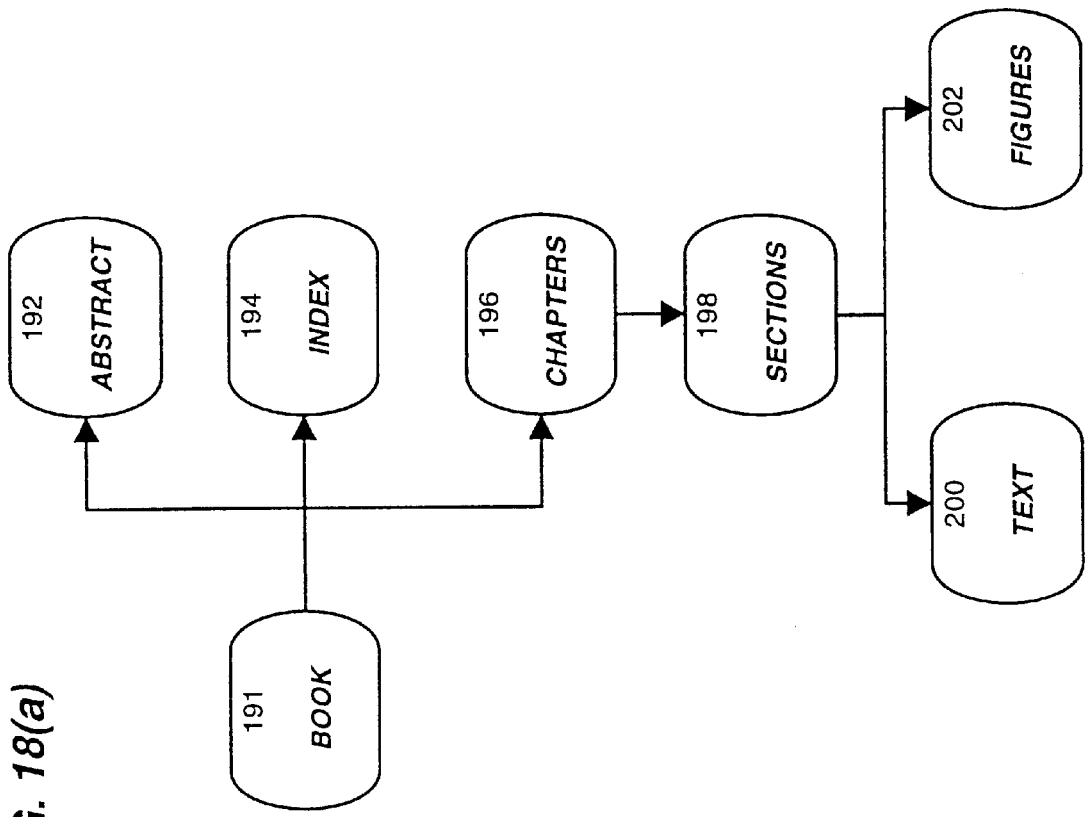

With reference to FIG. 18(a), a digital book 191 consists of an abstract 192, an index 194, and various chapters 196. Each chapter 196 comprises sections 198, and each section comprises text 200 and figures 202. The distributor can decide to package the book 191 such that the abstract 192 and the index 194 are available for browsing, but all other data are protected (encrypted). If the rules specify that the text is restricted in certain ways, then the packaged data structure 108 has the form shown in FIG. 18(b), wherein encrypted body part 120 includes all chapters 196, unencrypted body part 122 includes the abstract 192 and index 194, and encrypted rules 124 contains the encrypted version of the rules.

Movies

Figure 19B:
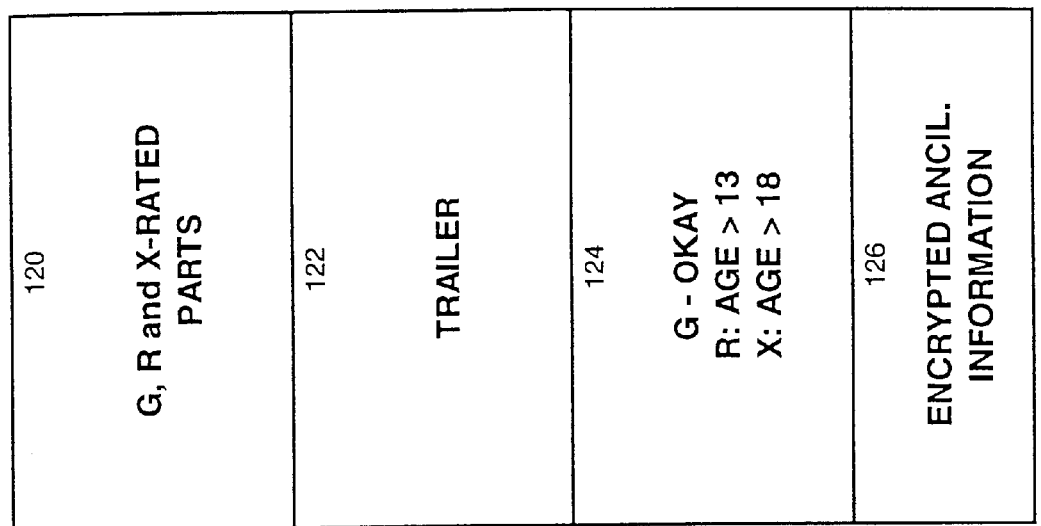
Figure 19A:
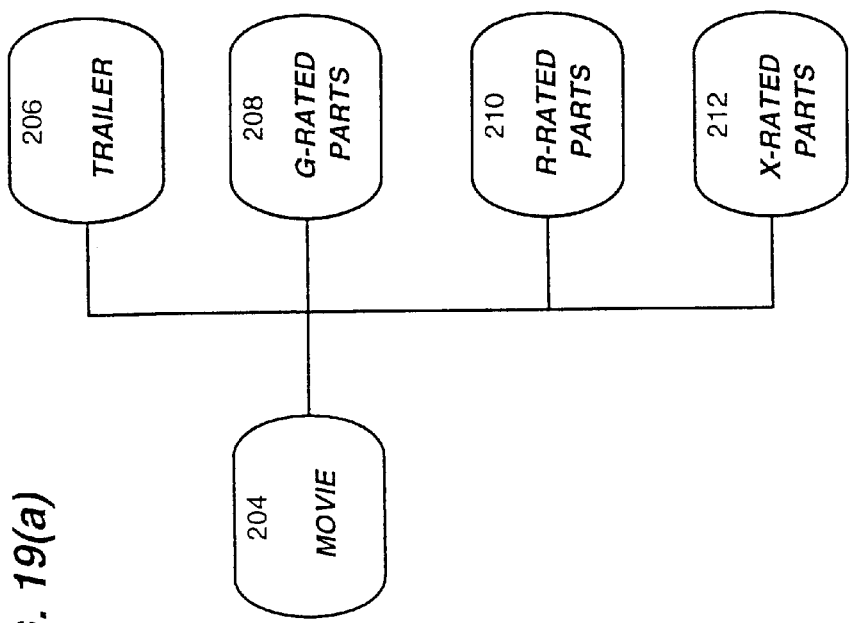

With reference to FIG. 19(a), a movie 204 can be made such that different parts of the movie combine to form either a trailer 206, a G-rated version (from G-rated parts 208), an R-rated version (formed from G-rated parts 208 and R-rated parts 210) or an X-rated version (formed from G-rated parts 208, R-rated parts 210 and X-rated parts 212). The packaged data structure 108 for this movie has the form shown in FIG. 19(b), wherein encrypted body part 120 includes all the G, R and X-rated parts 208–212, unencrypted body part 122 includes the trailer 206, and encrypted rules 124 contains the encrypted version of the age-based rules which control viewing of the various versions of the movie.

Figure 19D:
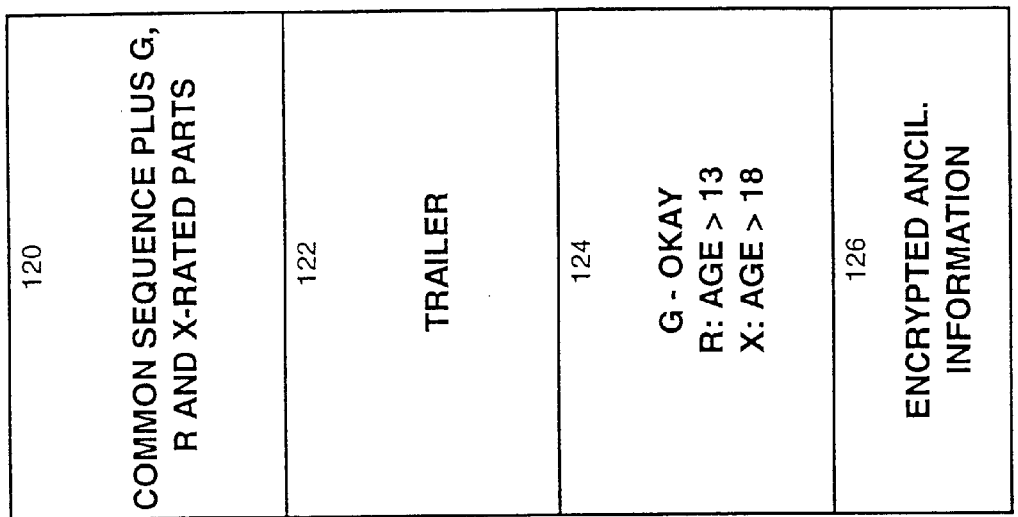
Figure 19C:
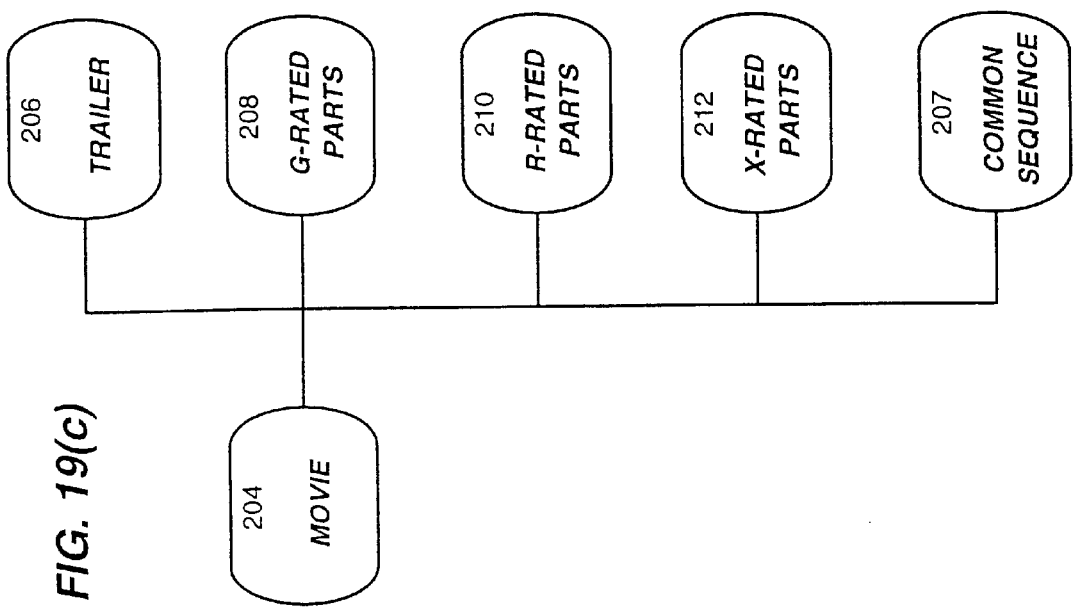

In one embodiment, as shown in FIG. 19(c), a movie may be released with a main body 207 (having elements common to all three versions) and sections for each of the G, R and X-rated parts (208, 210, 212, respectively). Sections of the movie are selected from one of the rated parts, depending on the permission level (G, R or X) set. FIG. 19(d) shows packaged data structure 108 for such an arrangement.

Software

With reference to FIG. 20(a), a software program such as, for example, a word-processor 214 may include a controlled file access part 216, an editor 218, a grammar checker 220, and other features 222. The rules obtained by the user will govern the features of the software that may be used and the quantities of data that may be processed. The rules shown in FIG. 20(c) indicate that the user may not employ the grammar checker and may operate on no more than nine files. The packaged data structure for this software (without rules) 150 is shown in FIG. 20(b), wherein encrypted body part 120 includes the file access mechanism 216, the grammar checker 220 and various other functions 222, and unencrypted body part 122 includes the editor 218. The encrypted rules 124 are shown separately in FIG. 20(c).

Documents

With reference to FIG. 21(a), a document such as a legal document 224 comprises paragraphs 226 of words 228. In order to limit access to non-redacted portions of the document, the rules would require blacking out all redacted words. Accordingly, the corresponding packaged data structure is shown in FIG. 21(b), wherein encrypted body part 120 includes the redacted portions of the document and unencrypted body part 122 contains the non-redacted portions of the document.

Map Image Data

Figure 22B:
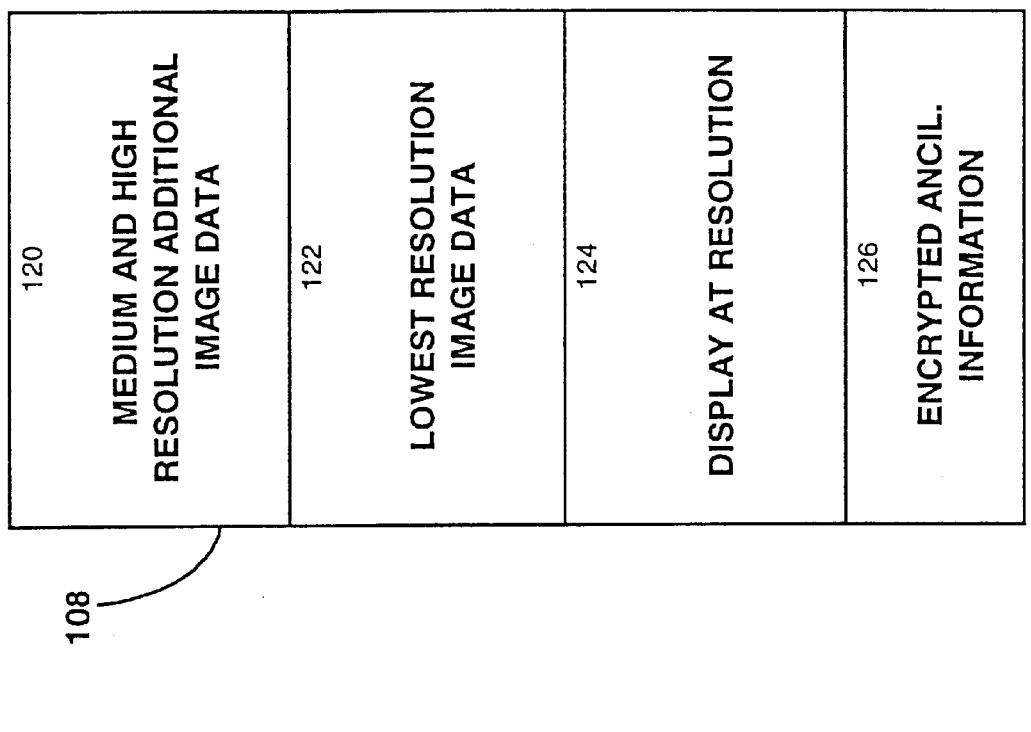
Figure 22A:

With reference to FIG. 22(a), map image data 230 may be available at three resolutions (high, medium and low). The rules may specify that people with a security clearance of greater than "top-secret" can view the data at high resolution, and all non-military users can only view the map data at low resolution. The corresponding packaged data structure is shown in FIG. 22(b), wherein encrypted body part 120 includes all data beyond low resolution (that is, those data required for medium and high resolution) and unencrypted body part 122 contains the low resolution data.

Global Positioning System (GPS) Software

Figure 23B:
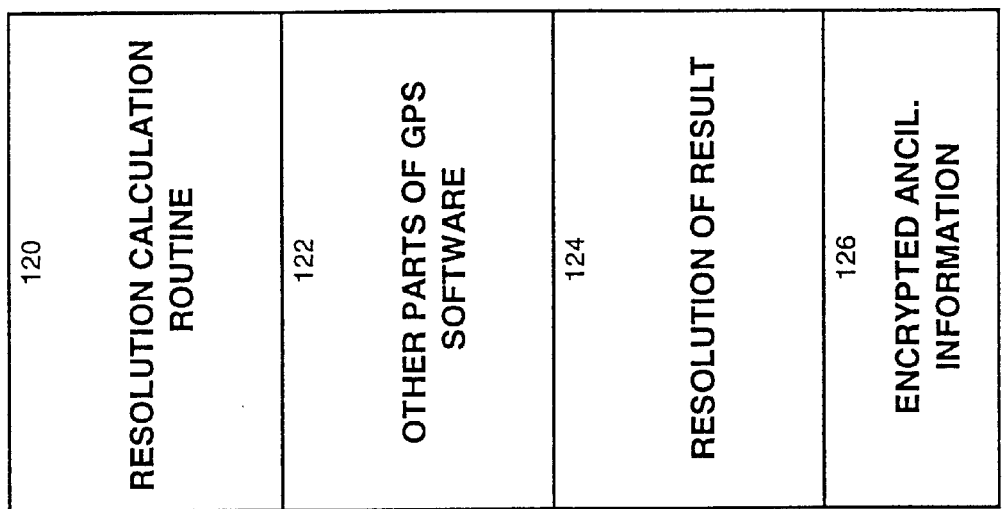
Figure 23A:
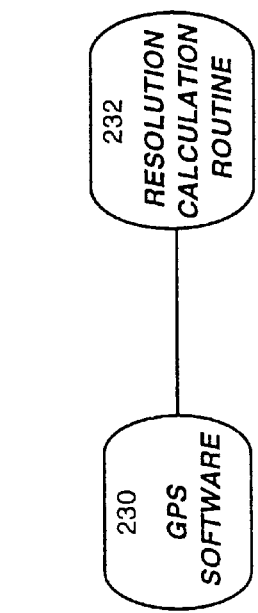

With reference to FIG. 23(a), GPS software includes an output routine 232 which can produce output at various degrees of accuracy. The degree of accuracy depends on the security clearance of the user. A corresponding packaged data structure is shown in FIG. 23(b), wherein encrypted body part 120 includes the resolution calculation routine 232 and unencrypted body part 122 contains the other parts of the GPS software 230.

Relationship Among Rule Sets

In some embodiments, the access mechanism may be supplied with a set of rules built-in. In such an access mechanism the built-in rules might include rules that can or cannot be overruled (made less restrictive) by rules provided with packaged data. These initial rules can perform a number of functions and implement a number of policies. As examples, the access mechanisms provided in controlled output devices can include built-in rules (that cannot be overruled). which limit the device only to being an output device; or, the access mechanism provided with a VCR or a videodisc player can include rules (that cannot be overruled) which require the device to enforce the copyright laws of the country in which the device is sold. Whether or not internal built-in rules can be overruled by rules provided externally can be specified in the internal rules themselves.

While the present invention may be used to protect intellectual property by controlling access to that property, the mechanisms discussed herein are technical in nature and are independent of any form of legal protection—a purely technological approach has been presented to controlling access to data. Indeed, the invention offers the intellectual property owner the opportunity to restrict access and use of his or her data beyond the protections that may be available in law. The protection offered by the present invention may be used to enforce rights in intellectual property whether the protection at law is categorized as copyright, trade secret, contract, or something else. The cost-benefit tradeoff of seeking protection at law must be made by those with a vested interest in the intellectual property.

Typical computer systems are implemented at various levels, each level effectively defining a different virtual machine. Generally, each level of implementation can access the levels below it. In many systems it is desirable to have each level only access the level immediately below it. In that way, various policies can be enforced.

Typically the higher level virtual machines are implemented in software and the lower level machines are implemented in hardware. However, there is no precise hardware/software boundary between levels.

Figure 24:
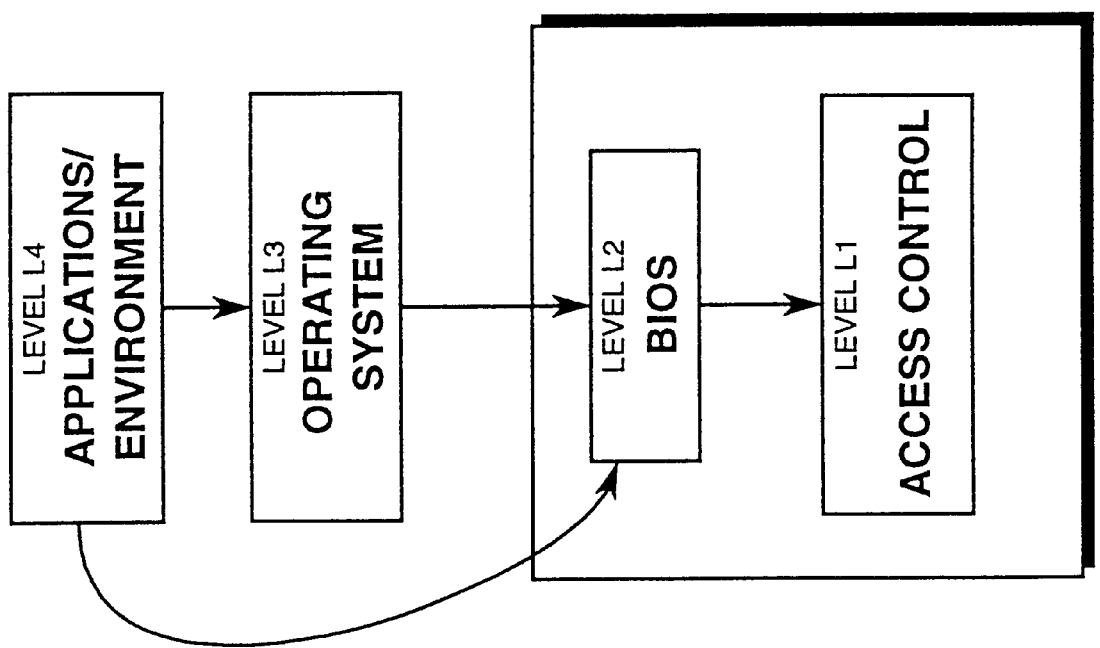
FIG. 24 shows various implementation levels of a typical computer system employing an access mechanism according to the present invention.

With reference to FIG. 24, for example, a computer system has a high-level application environment (level L4). These applications invoke (call) operating system level (L3) processes to perform various system functions. The OS level (L3) processes in turn invoke lower-level Basic Input/Output System (BIOS) machine dependent instructions as required (level L2). Note that application level (L4) programs might be permitted to bypass the OS level (L3) and invoke BIOS level (L2) processes directly, thereby avoiding any OS level (L3) policy checking and enforcement.

As an example, an application (executing a level L4) program which wishes to open a particular named file would invoke an operating system "open" procedure for that named file. The OS determines the location of the file (using, for example, an internal map between file names and locations) and then invokes a lower level (L2) BIOS routine to perform the actual seek to the file and the open and read. However, the application program might be permitted to bypass the operating system's "open" process and invoke the BIOS routines directly.

It is desirable to implement the access control mechanisms of the present invention at a low level, preferably at or below the BIOS level (level L1). This prevents users from by-passing the access control mechanisms of the invention and thereby circumventing the rule enforcement.

Thus, a system for controlling access and distribution of digital property is provided. One skilled in the art will appreciate that the present invention can be practiced by other than the described embodiments, which are presented for purposes of illustration and not limitation, and the present invention is limited only by the claims that follow.

What is claimed is:

1. A method of distributing data, the method comprising:
    protecting portions of the data; and
    openly distributing the protected portions of the data, whereby
    each and every access to an unprotected form of the protected portions of the data is limited in accordance with rules defining access rights to the data as enforced by an access mechanism, so that unauthorized access to the protected portions of the data is not to the unprotected form of the protected portions of the data.

2. A method as in claim 1, wherein
    the protecting of portions of the data comprises encrypting the portions of the data, whereby unauthorized access to the protected data is not to the un-encrypted form of the protected data.

3. A method as in claim 2, wherein the encrypting of portions of the data encrypts the portions of the data with a data encrypting key, the data encrypting key having a corresponding data decrypting key, the method further comprising:
    encrypting the data encrypting key.

4. A method as in claim 3, further comprising:
    providing a decrypting key corresponding to the key encrypting key.

5. A method as in claim 1, wherein the data represent at least one of software, text, numbers, graphics, audio, and video.

6. A method as in claim 1, wherein the rules indicate which users are allowed to access the protected portions of the data, the method further comprising
    allowing the user access to the unprotected form of a protected portion of the data only if the rules indicate that the user is allowed to access that portion of the data.

7. A method as in claim 1 wherein the rules indicate distribution rights of the data, the method further comprising:
    allowing distribution of the unprotected form of the protected data portions only in accordance with the distribution rights indicated in the rules.

8. A method as in claim 1, wherein the rules indicate access control rights of the user, the method further comprising:
    allowing the user to access the unprotected form of the protected data portions only in accordance with the access control rights indicated in the rules.

9. A method as in claim 8, wherein the access control rights include at least one of:
    local display rights,
    printing rights,
    copying rights,
    execution rights,
    transmission rights, and
    modification rights.

10. A method as in claim 1, wherein the rules indicate access control quantities, the method further comprising:
    allowing access to the unprotected form of the protected data portions only in accordance with the access control quantities indicated in the rules.

11. A method as in claim 10, wherein the access control quantities include at least one of:
    a number of allowed read-accesses to the data;
    an allowable size of a read-access to the data;
    an expiration date of the data;
    an intensity of accesses to the data;
    an allowed level of accuracy and fidelity; and
    an allowed resolution of access to the data.

12. A method as in claim 1, wherein the rules indicate payment requirements, the method further comprising:
    allowing access to the unprotected form of the protected data portions only if the payment requirements indicated in the rules are satisfied.

13. A method as in claim 1, wherein the rules relate to at least one of:
    characteristics of users;
    characteristics of protected data; and
    environmental characteristics.

14. A method as in claim 1 wherein the rules defining access rights include at least one internal rule built in the access mechanism.

15. A method as in claim 14 wherein the at least one internal rule cannot be made less restrictive by any other rules.

16. A method as in claim 14 wherein the access mechanism is contained in a stand-alone device.

17. A method as in claim 16 wherein the stand-alone device is selected from the group consisting of: a facsimile machine, a television, a VCR, a laser printer, a telephone, a laser disk player, and a computer system.

18. A method as in claim 1,
    wherein the access mechanism is contained in a stand-alone device selected from the group comprising: a facsimile machine, a television, a VCR, a laser printer, a telephone, a laser disk player, and a computer system; and
    wherein the rules defining access rights include at least one internal rule built-in to the access mechanism; and wherein the at least one internal rule comprises access control rights to the data.

19. A method as in claim 1, further comprising:

providing a distribution rule, wherein the rules defining access rights comprise the distribution rule and at least one internal rule built in to the access mechanism.

20. A method as in claim 19 wherein the protecting of portions of the data comprises encrypting the portions of the data using a data encrypting key having a corresponding data decrypting key, and wherein the distribution rule comprises a data decrypting key.

21. A method of distributing data for subsequent controlled use of the data by a user, the method comprising:

protecting portions of the data;

protecting rules defining access rights to the data; and openly distributing the protected portions of the data and the protected rules, whereby controlled access to an unprotected form of the protected portions of the data is provided only in accordance with the rules as enforced by an access mechanism, so that unauthorized access to the protected portions of the data is not to the unprotected form of the protected portions of the data.

22. A method of distributing data for subsequent controlled use of the data by a user, some of the data having access rules already associated therewith, the access rules defining access rights to the data, the method comprising:

protecting portions of the data;

providing rules defining access rights to the data;

combining the provided rules with rules previously associated with the data;

protecting the combined rules; and openly distributing the protected portions of the data and the protected combined rules, whereby controlled access to the unprotected form of the protected portions of the data is provided only in accordance with the combined rules as enforced by an access mechanism, so that unauthorized access to the protected portions of the data is not to the unprotected form of the protected portions of the data.

23. A method of controlling secondary distribution of data, the method comprising:

protecting portions of the data;

protecting rules defining access rights to the data;

openly providing the protected portions of the data and the protected rules to a device having an access mechanism; and limiting transmission of the protected portions of the data from the device (a) only as protected data or (b) in accordance with the rules as enforced by the access mechanism, so that unauthorized access to the protected portions of the data is not to an unprotected form of the protected portions of the data.

24. A method of accessing openly distributed data, the method comprising:

obtaining openly distributed data having protected data portions and rules defining access rights to the protected data portions; and limiting each and every access to an unprotected form of the protected data portions in accordance with the rules as enforced by an access mechanism, so that unauthorized access to the protected portions of the data is not to the unprotected form of the protected data portions.

25. A device for displaying images represented by data comprising protected data portions and rules defining access rights to the data, the device comprising:

means for storing the rules;

an access mechanism for accessing the data only in accordance with the rules, whereby user access to an unprotected form of the protected data portions is permitted by the access mechanism only if the rules indicate that the user is allowed to access the protected portions of the data, the access being enforced by the access mechanism; and means for displaying the images represented by the accessed data.

26. A device as in claim 25 wherein the rules defining access rights include at least one internal rule built in the access mechanism.

27. A device as in claim 26 wherein the internal rules cannot be made less restrictive by any other rules.

28. A device as in claim 26 wherein the internal rules limit the device only to being an output device.

29. A device as in claim 26 wherein the device is selected from the group consisting of: a VCR, a laser disk player, and a computer system.

30. A device for outputting images represented by data comprising protected data portions and rules defining access rights to the data, the device comprising:

means for storing the rules;

an access mechanism for accessing the data only in accordance with the rules, whereby user access to an unprotected form of the protected data portions is permitted by the access mechanism only if the rules indicate that the user is allowed to access the protected portions of the data, the access being enforced by the access mechanism; and means for outputting the images represented by the accessed data.

31. A device for outputting an audio signal represented by data comprising protected data portions and rules defining access rights to the data, the device comprising:

means for storing the rules;

an access mechanism for accessing the data only in accordance with the rules, whereby user access to an unprotected form of the protected data portions is permitted by the access mechanism only if the rules indicate that the user is allowed to access the protected portions of the data, the access being enforced by the access mechanism; and means for outputting the audio signal represented by the accessed data.

32. A device for outputting an output signal based on data comprising protected data portions and rules defining access rights to the data, the device comprising:

means for storing the rules;

an access mechanism for accessing the data only in accordance with the rules, whereby user access to an unprotected form of the protected data portions is permitted by the access mechanism only if the rules indicate that the user is allowed to access the protected portions of the data, the access being enforced by the access mechanism; and means for outputting the output signal represented by the accessed data.

33. A device for generating an output signal corresponding to data comprising protected data portions and rules defining access rights to the digital data, the device comprising:

means for storing the rules;

an access mechanism for accessing the digital data only in accordance with the rules, whereby user access to an unprotected form of the protected data portions is permitted by the access mechanism only if the rules indicate that the user is allowed to access the protected portions of the data; and means for generating the output signal from the accessed data.

34. A device for distributing data for subsequent controlled use of the data by a user, the device comprising:

means for protecting portions of the data;

means for protecting rules defining access rights to the data; and means providing the protected portions of the data and the protected rules;

whereby a user is provided controlled access to the data only in accordance with the rules as enforced by an access mechanism, so that unauthorized access to the protected portions of the data is not to an unprotected form of the protected portions of the data.

35. A device for distributing data for subsequent controlled use of the data by a user, some of the data having access rules already associated therewith, the access rules defining access rights to the data, the device comprising:

means for protecting portions of the data;

means for providing rules concerning access rights to the data;

means for combining the provided rules with rules previously associated with the data;

means for protecting the combined rules; and means for providing the protected portions of the data and the protected combined rules;

whereby the user is provided controlled access to an unprotected form of the protected portions of the data only in accordance with the combined rules as enforced by an access mechanism, so that unauthorized access to the protected portions of the data is not to the unprotected form of the protected portions of the data.

36. A process control system comprising a device for controlling access to data, the data comprising protected data portions and rules defining access rights to the data, the device comprising:

means for storing the rules; and an access mechanism for accessing the unprotected form of the protected data portions only in accordance with the rules, whereby output of an unprotected form of the protected data portions is permitted by the access mechanism only in such manner as is permitted by the rules.

37. A process control system as in claim 36 wherein the rules defining access rights include at least one internal rule built in the access mechanism.

38. A general purpose computer system comprising a device for controlling access to data, the data comprising protected data portions and rules defining access rights to the data, the device comprising:

storage means for storing the rules; and an access mechanism for accessing the unprotected form of the protected data portions only in accordance with the rules, whereby user access to an unprotected form of the protected data portions is permitted by the access mechanism only if the rules indicate that the user is allowed to access the protected portions of the data.

39. A computer system as in claim 38 wherein the rules defining access rights include at least one internal rule built in the access mechanism.

40. A computer system as in claim 38 wherein the system is implemented at various levels, and wherein at least one low level effectively defines a virtual machine in which the access mechanism is implemented, and wherein mechanisms implemented at each level of system implementation can invoke the levels below their level of implementation.

41. A computer system as in claim 40 wherein the various levels of the computer system comprise:

an application environment level;

an operating system (OS) level which is at a lower level than the application environment level; and a Basic Input/Output System (BIOS) level which is lower than OS level, and wherein the access mechanism is preferably implemented at or below the BIOS level.

42. A computer system as in claim 40 wherein the implementation of the access mechanism prevents a user from by-passing the access mechanism and thereby prevents a user circumventing rule enforcement by the access mechanism.

43. A computer system as in claim 40 wherein a mechanism implemented at a particular level can invoke only its implementation level and the level immediately below its implementation level.

* * * * *

(12) INTER PARTES REVIEW CERTIFICATE (106th)
United States Patent
Schneck et al.

(10) Number: US 6,314,409 K1
(45) Certificate Issued: Sep. 22, 2015

(54) SYSTEM FOR CONTROLLING ACCESS AND DISTRIBUTION OF DIGITAL PROPERTY

(75) Inventors: Paul B. Schneck; Marshal D. Abrams

(73) Assignee: INTELLECTUAL VENTURES II LLC

Trial Numbers:

IPR2014-00719 filed May 2, 2014
IPR2014-00722 filed May 2, 2014

Petitioners: Compass Bank; Commerce Bancshares, Inc.; First National Bank of Omaha

Patent Owner: Intellectual Ventures II LLC

Inter Partes Review Certificate for:

Patent No.: 6,314,409
Issued: Nov. 6, 2001
Appl. No.: 09/178,606
Filed: Oct. 26, 1998

The results of IPR2014-00719 and IPR2014-00722 are reflected in this inter partes review certificate under 35 U.S.C. 318(b).

INTER PARTES REVIEW CERTIFICATE
U.S. Patent 6,314,409 K1
Trial No. IPR2014-00719
Certificate Issued Sep. 22, 2015

AS A RESULT OF THE INTER PARTES REVIEW PROCEEDING, IT HAS BEEN DETERMINED THAT:

Claim 23 is disclaimed.

\* \* \* \* \*